United States Patent
Chen et al.

(10) Patent No.: US 11,468,180 B2
(45) Date of Patent: Oct. 11, 2022

(54) DATA PRIVACY PROTECTION ON CLOUD-BASED OPTIMIZATION SYSTEMS

(71) Applicant: FUJITSU LIMITED, Kawasaki (JP)

(72) Inventors: Wei-Peng Chen, Fremont, CA (US); Mehdi Bahrami, Fremont, CA (US); Junhee Park, Okemos, MI (US)

(73) Assignee: FUJITSU LIMITED, Kawasaki (JP)

( * ) Notice: Subject to any disclaimer, the term of this patent is extended or adjusted under 35 U.S.C. 154(b) by 358 days.

(21) Appl. No.: 16/836,816

(22) Filed: Mar. 31, 2020

(65) Prior Publication Data
US 2021/0303704 A1    Sep. 30, 2021

(51) Int. Cl.
*G06F 21/60* (2013.01)

(52) U.S. Cl.
CPC ................... *G06F 21/604* (2013.01)

(58) Field of Classification Search
CPC ............... G06F 21/604; G06N 10/00
See application file for complete search history.

(56) References Cited

U.S. PATENT DOCUMENTS

| | | | | |
|---|---|---|---|---|
| 9,530,873 | B1 * | 12/2016 | Carroll | G06N 10/00 |
| 11,194,573 | B1 * | 12/2021 | Smith | G06F 9/3804 |
| 2014/0025606 | A1 * | 1/2014 | Macready | G06N 5/003 706/14 |
| 2015/0006443 | A1 * | 1/2015 | Rose | G06N 20/00 706/12 |
| 2015/0205759 | A1 * | 7/2015 | Israel | G06N 10/00 703/2 |
| 2016/0321559 | A1 * | 11/2016 | Rose | G06N 10/00 |
| 2017/0019185 | A1 * | 1/2017 | Agarwal | G06N 10/00 |
| 2018/0240032 | A1 * | 8/2018 | van Rooyen | G06K 9/6297 |
| 2020/0349509 | A1 * | 11/2020 | Sharma | H04W 28/0226 |

OTHER PUBLICATIONS

Vaibhaw Kumar, Quantum annealing for combinatorial clustering, 2018, https://doi.org/10.1007/s11128-017-1809-2 (Year: 2018).*

(Continued)

*Primary Examiner* — Richard A McCoy
(74) *Attorney, Agent, or Firm* — Fujitsu Patent Center

(57) ABSTRACT

According to an aspect of an embodiment, operations may include receiving a first input corresponding to a selection of a combinatorial optimization problem and receiving a set of datapoints as input. The operations may further include generating a first quadratic unconstrained binary optimization (QUBO) formulation based on an objective function for the combinatorial optimization problem and the received set of datapoints. The operations may further include selecting a first privacy setting and encoding the first QUBO formulation based on the selected privacy setting to generate a second QUBO formulation. The operations may further include submitting the generated second QUBO formulation to an optimization solver machine and receiving a first solution of the second QUBO formulation. The operations may further include decoding the first solution to produce a second solution and publishing an output of the combinatorial optimization problem on a user device based on the second solution.

20 Claims, 11 Drawing Sheets

(56) References Cited

OTHER PUBLICATIONS

Website: "D-Wave Expands Leap Quantum Cloud Service and Application Environment to Europe and Japan", D-Wave—The Quantum Computing Company, https://www.dwavesys.com/press-releases/d-wave-expands-leap-quantum-cloud-service-and-application-environment-europe-and; Mar. 26, 2019; obtained Sep. 9, 2020.
Website: "Digital Annealer—Quantum Computing Technology, Available Today", https://www.fujitsu.com/global/services/business-services/digital-annealer/index.html, Fujitsu Limited, Obtained Sep. 9, 2020.
Website: "D-Wave's Ocean Software", D-Wave—The Quantum Computing Company, https://ocean.dwavesys.com/, obtained Sep. 9, 2020.
Website: https://1qbit.com/technology/, obtained Jun. 19, 2019.
Glover, Fred, Gary Kochenberger, and Yu Du. "A Tutorial on Formulating and Using QUBO Models." (2019).
https://www.fujitsu.com/jp/documents/digitalannealer/services/P3KD-1152.pdf (obtained Jul. 13, 2021).

\* cited by examiner

DATA PRIVACY PROTECTION ON CLOUD-BASED OPTIMIZATION SYSTEMS

FIELD

The embodiments discussed in the present disclosure are related to protection of privacy of customer data on cloud-based optimization systems.

BACKGROUND

Many problems in real-world can be formulated by mathematical models, in particular as combinatorial optimization problems. Majority of the combinatorial optimization problems are under the category of Non-Deterministic Polynomial-time (NP) problems. These NP problems are usually computationally intractable by conventional computers. Optimal or near-optimal solution for theses NP problems can be achieved using optimization solvers.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of the disclosure, operations may include receiving a first input corresponding to a selection of a first combinatorial optimization problem. The operations may further include receiving a set of datapoints as input for the first combinatorial optimization problem and generating a first quadratic unconstrained binary optimization (QUBO) formulation based on a first objective function for the first combinatorial optimization problem and the received set of datapoints. The operations may further include selecting a first privacy setting for the generated first QUBO formulation and encoding the first QUBO formulation to generate a second QUBO formulation based on the selected first privacy setting. The operations may further include submitting the generated second QUBO formulation to an optimization solver machine via an application programming interface (API) call and receiving a first solution of the submitted second QUBO formulation from the optimization solver machine. The operations may further include decoding the first solution to produce a second solution of the first QUBO formulation and publishing an output of the combinatorial optimization problem on a user device based on the second solution.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
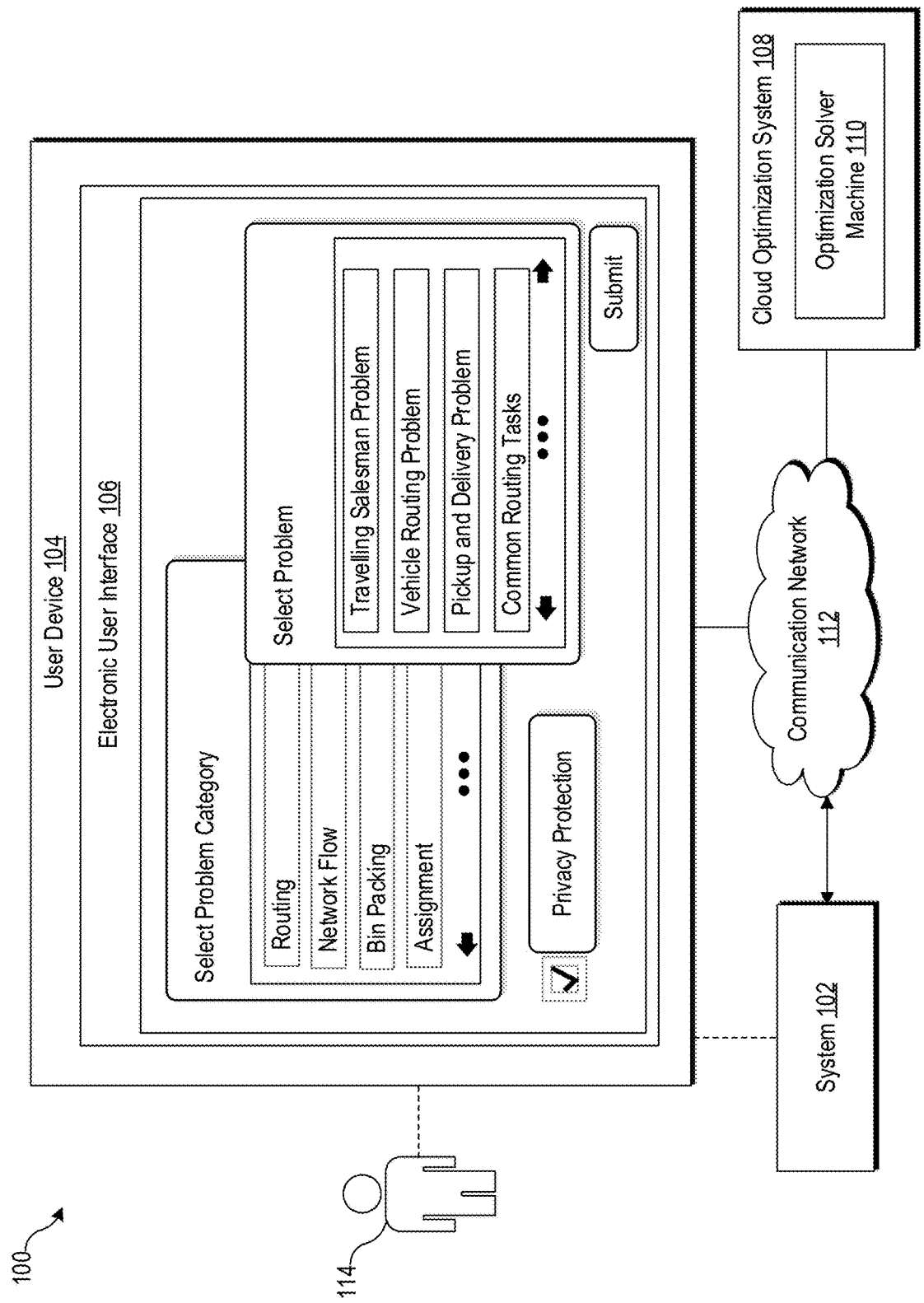
FIG. 1 is a diagram representing an exemplary network environment for protection of data privacy on cloud optimization systems.

Embodiments of the present disclosure are explained with reference to the accompanying drawings.

Data privacy is one of the key concerns for users that adopt public cloud services, such as cloud-based optimization services to obtain solutions for their combinatorial optimization problems. Any cloud-based optimization service may typically rely on a software-based optimization solver (hosted in a public cloud environment) or on an optimization solver which may be executed on top of a specialized hardware secured in the service providers' cloud environment. Without any privacy protection, it becomes possible for cloud service providers to recover sensitive user information from a formulation of the optimization problem, which may be submitted to such cloud-based optimization solvers via API calls.

Some embodiments described in the present disclosure relate to methods and systems for protection of customer data in cloud optimization systems. Many of the real world problems can be treated as a combinatorial optimization problem. Many real world problems in various industries involve decisions as discrete choices which may fall into the scope of combinatorial optimization problems. For example, a real world problem for finding best route for delivery of orders may be considered as a combinatorial optimization problem, in which it may be required to identify a shortest route between all the drop off/pickup points for the orders. Any particular combinatorial optimization problem will usually have a specific set of optimal solutions that have to be searched from a discrete solution space.

In order to compose an optimization problem, users may have to input various parameters' values of the optimization problem to suitable optimization solvers. Usually, such values are considered as confidential or sensitive information for the users who want to solve the optimization problem. For instance, if a user wants to solve a vehicle routing problem (VRP) which is a common problem in logistics operation, he/she may need to input parameters' values, such as the amount of demand of all customers in VRP, to create the problem formulation. Then the user may call an optimization solver with the input of the problem formulation to obtain a solution to the optimization problem.

Conventional optimization solvers, including commercial solvers, such as Cplex or Gurobi and open source software solvers, such as Solving Constraint Integer Programs (SCIP) are executed on top of general purpose Central Processing Units. These solvers can be delivered to users as a form of software package and executed within users' environment (i.e. on-premise environment). There may be no issue about the users' data privacy under this setting as the user data still resides on the on-premise environment. However, with cloud-based optimization services, data privacy has become one of the key concerns for users who want to adopt such cloud services to solve their real world optimization problems. The concern may be also applicable to following cases:

1) When the conventional software optimization solver is hosted in the public cloud environment/hybrid cloud environment, and 2) When the optimization solver is required to be executed on top of a specialized hardware secured in the service providers' cloud environment/hybrid cloud environment.

Typically, a cloud-based optimization solver may need to support various type of combinatorial problems and therefore, the interface between users and such cloud-based solvers should support any general problem formulation. For example, a cloud-based optimization service provider may provide an Application Programming Interface (API) which may accept a Quadratic Unconstrained Binary Optimization (QUBO) formulation for a real world optimization problem as input and may return the solution for the QUBO formulation as output to the users. Nevertheless, creating QUBO to solve various problems in different mathematical formulations is a complicated task. Therefore, many cloud-based optimization service providers offer a Software Development Kit (SDK) to the users to assist them to compose codes to call such cloud-based APIs. Without any additional privacy protection mechanism, it is possible for such cloud-based service providers to recover the sensitive information from the inputs (such as input formulations) submitted over APIs to the cloud-based optimization solvers.

According to one or more embodiments of the present disclosure, the protection of data privacy on the cloud optimization systems may be achieved by configuring a system in a manner in which the system is able to encode a mathematical formulation (such as QUBO formulation) of a combinatorial optimization problem (which may be modelled on a real world optimization problem). At first, the system may receive inputs, via a user interface, for selection of a combinatorial optimization problem and a set of datapoints as input for the selected combinatorial optimization problem. The system may generate a QUBO formulation based on the selected combinatorial optimization problem and the set of datapoints. The system may encode the QUBO formulation and the encoded QUBO formulation may be submitted via an API call to the optimization solver machine (cloud-based) to generate a solution of the encoded QUBO formulation.

In these or other embodiments, after receiving the solution of the encoded QUBO formulation, the system may decode the solution of the encoded QUBO formulation. The output of the combinatorial optimization problem may be published on a user device (i.e. on the on-premise environment) based on the decoded solution.

It should be noted that the encoding of the generated first QUBO formulation may be done to prevent the optimization solvers from recovering the actual received set of datapoints by performing calculations on the generated first QUBO formulation. Even if the optimization solvers produce the set of datapoints after encoding, the produced set of datapoints will be different from the actual received set of datapoints.

This present disclosure focuses on enhancing data privacy of end users when they utilize the cloud-based optimization solvers to solve their combinatorial optimization problem. In particular, we explore the privacy protection mechanism under the setting that end users use service provider's software development environment in combination with cloud hardware environment. In particular, the software development environment may be offered to users as on-premise software on users' on-premise environment. Privacy of customers' data may be preserved through secure data processing by the on-premise software. Information sent to cloud hardware environment may be in the format of QUBO which may be indistinguishable for the cloud hardware environment to determine customers data including type of problems, types of formulations, parameters of formulations, and the like.

In these or other embodiments, an SDK may be deployed on a user-end device within users' on-premise environment. The SDK may include binary codes or source codes which may be adequate for users to compose formulations for their real-world optimization problem, generate QUBO, and submit the QUBO to the cloud-based optimization solver to obtain the solution to their real-world optimization problem. One or multiple levels of privacy settings may be provided to users. Users may configure their privacy preferences by selecting a suitable level of privacy setting and the generated QUBO may be encoded based on their selected privacy setting. When a higher privacy protection setting is selected, more steps of privacy protection mechanisms may be applied.

FIG. 1 is a diagram representing an exemplary network environment for protection of data privacy on cloud optimization systems, arranged in accordance with at least one embodiment described in the present disclosure. With reference to FIG. 1, there is shown a network environment 100. The network environment 100 includes a system 102, a user device 104, and a cloud optimization system 108 that may include an optimization solver machine 110. The cloud optimization system 108 may be implemented as one of a private cloud, a public cloud, or a hybrid cloud. The system 102, the user device 104, and the cloud optimization system 108 may be communicatively coupled to each other, via a communication network 112. There is further shown a user 114 who may be associated with the user device 104.

The system 102 may be a part of an on-premise computing environment associated with the user 114. The system 102 may include suitable logic, circuitry, and interfaces that may be configured to display a set of user-selectable templates corresponding to a set of combinatorial optimization problems, onto an electronic User Interface (UI) 106 of the user device 104. Each of the set of combinatorial optimization problems may be associated with a real world optimization problem and may be mathematically formulated as an objective function with one or more constraints functions.

The system 102 may include the user device 104 as part of the on-premise computing environment. The user device 104 may include a suitable network interface to communicate with the optimization solver machine 110 on the cloud optimization system 108. Examples of the user device 104 may include, but are not limited to, a mobile device, a desktop computer, a laptop, a computer work-station, or a server, such as a cloud server.

The electronic UI 106 may be displayed on the user device 104 to allow the user 114 to compose a combinatorial optimization problem by selecting a problem template and editing the selected problem template to update an objective function and one or more constraints functions associated with the combinatorial optimization problem. By way of example, and not limitation, the combinatorial optimization problem may correspond to a Non-Deterministic Polynomial Time (NP) problem, which may be one of a graph coloring problem, a clique problem, an independent set problem, a clique cover problem, a minimax matching problem, a Knapsack problem, a sub-set sum problem, a bin packing problem, a cutting stock problem, a number partition problem, a Hamiltonian cycle problem, a travelling salesman problem, a direct feedback set problem, a vehicle routing problem, a job shop scheduling problem, a generalized assignment problem, a quadratic assignment problem, a set packing problem, a set partition problem, a set covering problem, or a K-Plex problem.

In an embodiment, the system 102 may receive a first input to select, from the displayed set of user-selectable templates. a first user-selectable template associated with a first combinatorial optimization problem. For example, a user-selectable template may be selected from a drop down menu which lists one or more template names of the combinatorial optimization problems. When a template name is selected from the drop down menu, the electronic UI 106 may display a composition page where the user 114 may be allowed to provide inputs and customize parameters and constraints of the first combinatorial optimization.

The system 102 may determine a first objective function associated with the first combinatorial optimization problem. The first objective function may be a mathematical formulation of the first combinatorial optimization problem and may need be optimized to determine an optimal or near optimal solution of the first combinatorial optimization problem. As an example, the first objective function may be determined as a default objective function with default constraints for the first user-selectable template.

In one or more embodiments, the electronic UI 106 may include an edit window, which the user 114 may use to customize the problem formulation by modifying the first objective function or/and the constraints. Using the edit window, the user 114 may be able to input a revised objective function and/or constraints of the first combinatorial optimization problem.

The electronic UI 106 may further allow the user 114 to provide a set of datapoints as input for the first combinatorial optimization problem. Depending on the user 114, the set of datapoints may be manually entered in a text box field of the electronic UI 106 or may be uploaded as data file(s). Based on the first objective function and the received set of datapoints, the system 102 may generate a first quadratic unconstrained binary optimization (QUBO) formulation, which may be a compatible input format for the optimization solver machine 110. The generated first QUBO formulation may include matrix, such as a square matrix (Q) of constants, which may depend on the first objective functions, the one or more constraint functions, and a vector of binary decision variables as encodings of the received set of datapoints. In one or more embodiments, instead of generating the first QUBO formulation, a mathematical relationship, such as equation(s) describing the relationship among the first objective functions, the one or more constraint functions, and a vector of binary decision variables may be generated as an initial problem setting, without calculating the square matrix (Q) of constants. The initial problem setting may consider penalty terms and slack variables for inequality constraints, which are typically included in a QUBO formulation.

In order to finish up the composition of the first combinatorial optimization problem, the user 114 may have to specify a privacy preference. For instance, the electronic UI 106 may include a plurality of user-selectable options, where each user-selectable option may correspond to a particular privacy protection level for the generated first QUBO formulation of the first combinatorial optimization problem. The system 102 may receive a user input which may include a selection of a user-selectable option from among the plurality of user-selectable options. Based on the user input, the system 102 may select a first privacy setting as user's privacy preference for the generated first QUBO formulation. Thereafter, based on the selected first privacy setting, the system 102 may encode the generated first QUBO formulation to generate a second QUBO formulation, which may be submitted to the optimization solver machine 110 on the cloud optimization system 108. The encoding of the first QUBO formulation to generate the second QUBO formulation is described in detail, for example, in FIGS. 5, 6, 7, and 8.

It should be noted that the selection of privacy protection levels may remain optional for the user 114. The user 114 may select to skip any particular privacy protection level. In that case, all the selected privacy protection levels may together be considered as the selected first privacy setting. Each privacy protection level may correspond to a particular encoding method and therefore, the selected privacy setting may enforce a sequential implementation of all encoding methods associated with respective privacy protection levels to generate the second QUBO formulation.

In one or more embodiments, instead of encoding the first QUBO formulation, the second QUBO formulation may be directly generated by updating the initial problem setting based on the selected first privacy setting and calculating the Q-matrix based on the updated problem setting. With a possibility that the user 114 may select several encoding methods through multiple privacy protection levels, there may be several versions of the first QUBO formulation in sequence, solutions of which may have to be decoded in the reverse order. In order to decode several versions of the first QUBO formulation, all the encoding rules/conditions of each individual privacy protection level may be stored as a setting, and then only one version of QUBO formulation (i.e. the second QUBO formulation) may be directly generated based on a sequential application of all the settings on the initial problem setting.

The generated second QUBO formulation may be submitted via one or more application programming interface (API) calls to the optimization solver machine 110. These API calls may be used to deliver a request from the system 102 to the optimization solver machine 110 on the cloud optimization system 108 and then relay a response to the request back from the optimization solver machine 110 to the system 102. The optimization solver machine 110 may receive the second QUBO formulation and may compute a first solution of the second QUBO formulation by using optimization solving methods, such as quantum annealing or simulated annealing, or by using a quantum computer.

In one or more embodiments of the disclosure, the optimization solver machine 110 may be implemented as a generalized quantum computing device hosted on the cloud optimization system 108. In such an implementation, the generalized quantum computing device may use specialized optimization solving software applications (e.g., a QUBO or Ising solver) at an application layer to implement searching algorithms or meta-heuristic algorithms, such as simulated annealing or quantum annealing, to search for the first solution of the second QUBO formulation from a discrete solution space.

The generalized quantum computing device may be different from a digital bit-based computing device, such as digital devices that are based on transistor-based digital circuits. The generalized quantum computing device may include one or more quantum gates that use quantum bits (hereinafter referred to as "qubits") to perform computations for different information processing applications, such as quantum annealing computations for solving combinatorial optimization problems. In general, a qubit can represent "0", "1", or a superposition of both "0" and "1". In most cases, the generalized quantum computing device may need a carefully controlled cryogenic environment to function properly. The generalized quantum computing device uses certain properties found in quantum mechanical systems, such as quantum fluctuations, quantum superposition of its Eigen-states, quantum tunneling, and quantum entanglement. These properties may help the generalized quantum computing device to perform computations for solving certain mathematical problems (e.g. QUBO functions) which are computationally intractable by conventional computing devices. Examples of the generalized quantum computing device may include, but are not limited to, a silicon-based nuclear spin quantum computer, a trapped ion quantum computer, a cavity quantum-electrodynamics (QED) computer, a quantum computer based on nuclear spins, a quantum computer based on electron spins in quantum dots, a superconducting quantum computer that uses superconducting loops and Josephson junctions, and nuclear magnetic resonance quantum computer.

In some other embodiments, the optimization solver machine 110 may be a quantum annealing computer that may be specifically designed and hardware/software optimized to implement searching algorithms or meta-heuristic algorithms, such as simulated annealing or quantum annealing. Similar to the generalized quantum computing device, the quantum annealing computer may also use qubits and may require a carefully controlled cryogenic environment to function properly.

In some other embodiments, the optimization solver machine 110 may correspond to a digital quantum-computing processor for solving user-end combinatorial optimization problems, which may be submitted in the form of a QUBO formulation. More specifically, the optimization solver machine 110 may be a digital annealer that may be based on a semiconductor-based architecture. The digital annealer may be designed to model the functionality of the quantum annealing computer on a digital circuitry. The digital annealer may operate at room temperature and may not require cryogenic environment to function. Also, the digital annealer may have a specific form factor that may allow it to fit on a circuit board that may be small enough to slide into the rack of a computing device or a computing infrastructure, such as a data center.

In some other embodiments, the optimization solver machine 110 may include a processor to execute software instructions associated with one or more searching algorithms and/or meta-heuristic algorithms, such as simulated annealing or quantum annealing. Examples of the implementation of the processor may include, but are not limited to, a Reduced Instruction Set Computing (RISC) processor, an Application-Specific Integrated Circuit (ASIC) processor, a Complex Instruction Set Computing (CISC) processor, a Graphical Processing Unit (GPU), a Co-processor, and/or a combination thereof.

Although, the second QUBO formulation encodes many parameters or constraints values of the first combinatorial optimization problem; the optimization solver machine 110 may not be able to differentiate between the second QUBO formulation and any other QUBO formulation, which may be typically submitted without any encoding to the optimization solver machine 110.

The optimization solver machine 110 may transmit the generated first solution to the system 102. The system 102 may receive the first solution from the optimization solver machine 110 and may decode the received first solution to produce a second solution of the generated first QUBO formulation. The decoding of the first solution to generate the second solution of the first QUBO formulation is described in detail, for example, in FIGS. 6, 7, and 8.

As the second solution may represent the solution of the first combinatorial optimization problem in terms of a vector of binary decision variables, the second solution may be used to generate an output in terms of initial parameters of the first combinatorial optimization problem. Specifically, to generate the output, each datapoint of the received set of datapoints for the first combinatorial optimization problem may be mapped to a respective binary decision variable in the second solution. Additional description may be included in the output to supplement analysis of the second solution on the on-premise software computing environment. For example, if the combinatorial optimization problem corresponds to a selection of products (i.e. datapoints) for a product aisle in a supermarket, then the value of 0 or 1 of a binary decision variable for a product may determine whether that product is to be included in the product aisle. The output for such problem may include names/quantity of products for which the binary decision variables are valued as 1. Products with 0 as the values of the binary decision variables may not be shown in the output.

The system 102 may publish the output of the first combinatorial optimization problem on the user device 104. For example, the output may be displayed on a display screen of the user device 104 or may be committed as an update on a database on the user device 104.

It should be noted that the communication among the system 102, the user device 104, and the optimization solver machine 110 of the cloud optimization system 108 may be performed via the communication network 112. The communication network 112 may include a communication medium through which the system 102 may communicate with the optimization solver machine 110, and different servers (not shown). Examples of the communication network 112 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Figure 2:
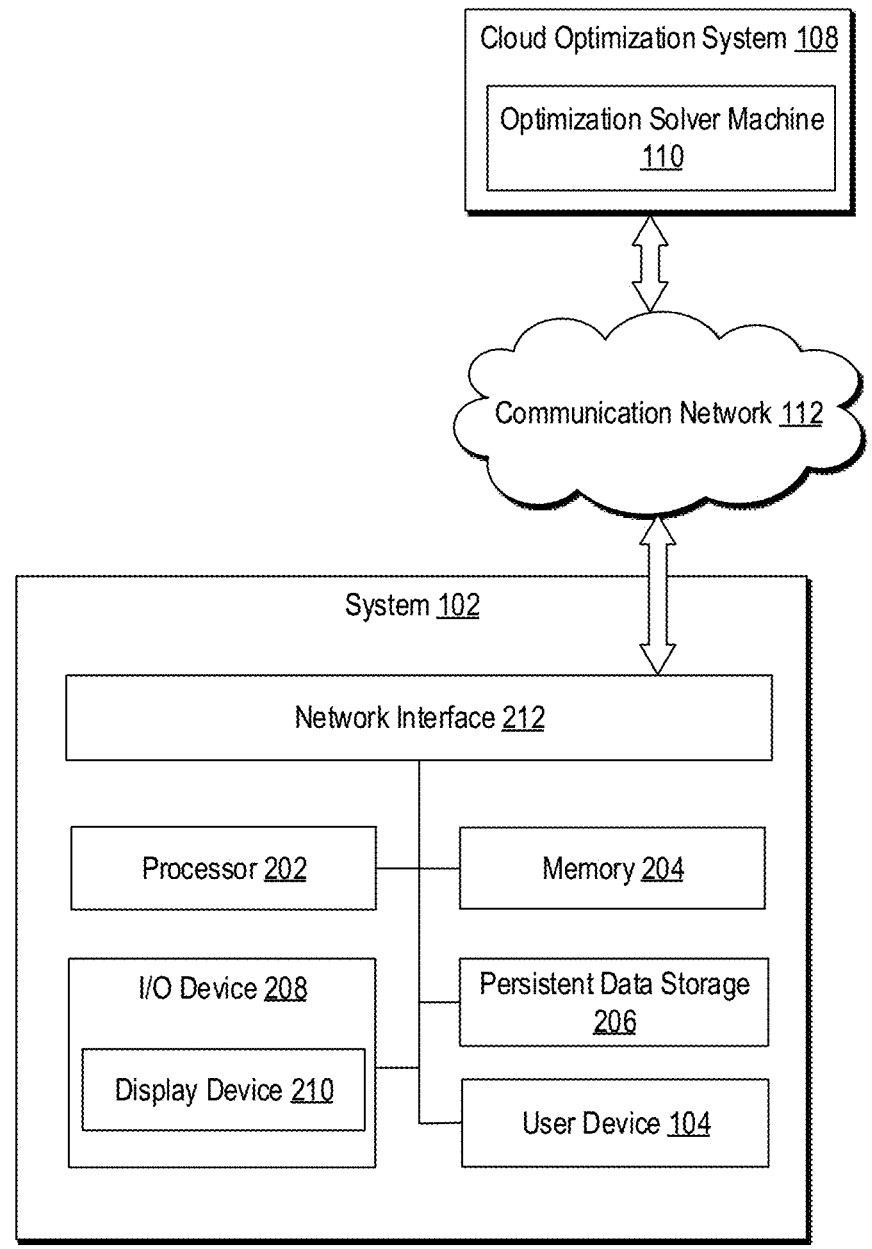
FIG. 2 is a block diagram of a system for protection of data privacy on cloud optimization systems.

FIG. 2 is a block diagram of a system for protection of data privacy on cloud optimization systems, according to at least one embodiment of the disclosure. FIG. 2 is explained in conjunction with elements from FIG. 1. With reference to FIG. 2, there is shown a block diagram 200 of the system 102. The system 102 may include a processor 202, a memory 204, and a persistent data storage 206. The system 102 may further include an input/output (I/O) device 208 (which may include a display device 210), a network interface 212, and the user device 104.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a GPU, a CPU, a RISC processor, an ASIC processor, a CISC processor, a co-processor, and/or a combination thereof.

The memory 204 may include suitable logic, circuitry, and/or interfaces that may be configured to store program instructions executable by the processor 202. In certain embodiments, the memory 204 may be configured to store information, such as the objective function and a set of constraints associated with each of the set of combinatorial optimization problem(s). The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202, operating systems, and/or application-specific information, such as logs and application-specific databases. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive the first input corresponding to selection of the first combinatorial optimization problem and the set of datapoints of the first combinatorial optimization problem. The I/O device 208 may be further configured to provide the output of the first combinatorial optimization problem on the display device 210. The I/O device 208 may include various input and output devices, which may be configured to communicate with the processor 202 and other components, such as the network interface 212. Examples of the input devices may include, but are not limited to, a touch screen, a keyboard, a mouse, a joystick, and/or a microphone. Examples of the output devices may include, but are not limited to, a display (such as the display device 210) and a speaker.

The display device 210 may include suitable logic, circuitry, interfaces, and/or code that may be configured to render the electronic user interface (UI) 106 onto a display screen of the display device 210. In one or more embodiments, multiple user inputs from a user (such as the user 114) may be received directly, via the display device 210. In such cases, the display screen of the display device 210 may be a touch screen to receive the multiple user inputs. The display device 210 may be realized through several known technologies such as, but not limited to, a Liquid Crystal Display (LCD) display, a Light Emitting Diode (LED) display, a plasma display, and/or an Organic LED (OLED) display technology, and/or other display technologies. Additionally, in some embodiments, the display device 210 may refer to a display screen of smart-glass device, a 3D display, a see-through display, a projection-based display, an electro-chromic display, and/or a transparent display.

The network interface 212 may include suitable logic, circuitry, interfaces, and/or code that may be configured to establish a communication between the system 102, the user device 104, and the optimization solver machine 110 hosted in the cloud optimization system 108, via the communication network 112. The network interface 212 may be implemented by use of various known technologies to support wired or wireless communication of the system 102 via the communication network 112. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the system 102 without departing from the scope of the present disclosure. For example, in some embodiments, the system 102 may include any number of other components that may not be explicitly illustrated or described.

Figure 3A:
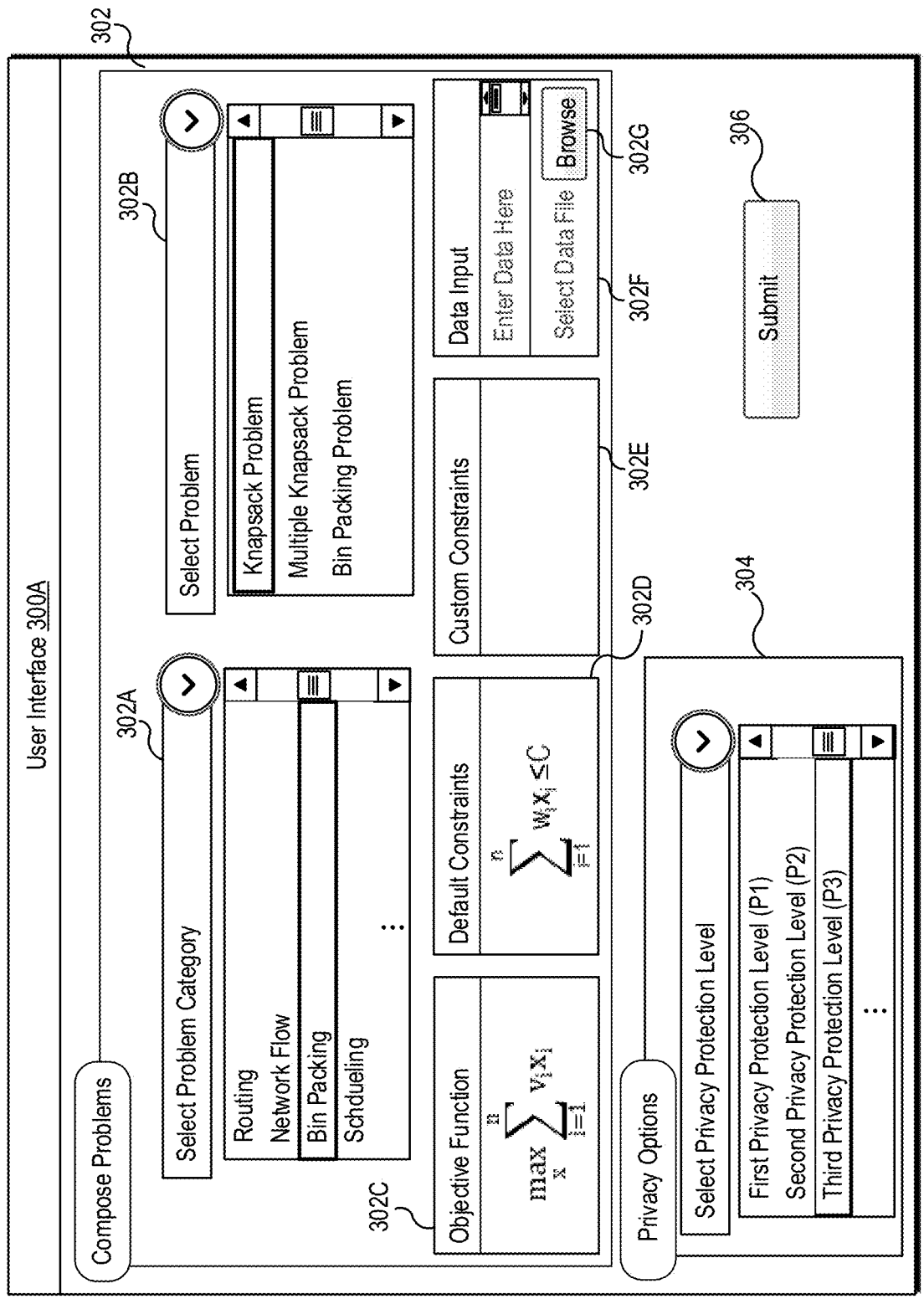
FIG. 3A is a diagram that illustrates an example user interface for a user to compose a combinatorial optimization problem.

FIG. 3A is a diagram that illustrates an example user interface for a user to compose a combinatorial optimization problem, according to at least one embodiment described in the present disclosure. FIG. 3A is explained in conjunction with elements from FIG. 1 and FIG. 2. With reference to FIG. 3A, there is shown an electronic UI 300A, which is an exemplary implementation of the electronic UI 106 of FIG. 1. The electronic UI 300A may be displayed on the user device 104 based on a user request, which may be received via an application interface displayed onto the display screen of the user device 104. The application interface may be part of an application software, for example, a software development kit (SDK), a cloud server-based application, a web-based application, an OS-based application/application suite, an enterprise application, a mobile application for composing and submitting a problem formulation of a combinatorial optimization problem.

On the electronic UI 300A, there is shown a set of UI elements, such as a first UI element 302, a second UI element 304, and a third UI element 306. In FIG. 3A, the first UI element 302 is labelled as, for example, "Compose Problems". The first UI element 302 may include a problem category menu 302A and a problem menu 302B. Through the problem category menu 302A and the problem menu 302B, a set of user-selectable templates corresponding to a set of combinatorial optimization problems may be displayed to the user 114. The problem category menu 302A may be a drop down menu, which may list a set of problem categories associated with various types of real-world optimization problems. Similarly, the problem menu 302B may be a drop down menu which may list a set of NP problems associated with each problem category. The combination of a problem category and an NP problem may correspond to a user-selectable problem template.

Each of the problem category menu 302A and the problem menu 302B may enable the user 114 to explore and identify a template (also referred to as a user-selectable template) for a particular combinatorial optimization problem that may be of interest to the user 114. At any time, the processor 202 may receive a first user input corresponding to a selection of a first user-selectable template for a first combinatorial optimization problem from among the set of combinatorial optimization problems. The selection of the first user-selectable template may correspond to the selection of the first combinatorial optimization problem.

The first user input may include a selection of a problem category from the problem category menu 302A, which may be followed by a selection of an NP problem from the problem menu 302B. As shown, for example, the problem category menu 302A includes routing, bin packing, network flow, and scheduling as the set of problem categories. In case the user 114 selects the bin packing as the problem category from the problem category menu 302A, the problem menu 302B may be updated to provide the knapsack problem, the multiple knapsack problem, and the bin packing problem as a set of NP problems. From the problem menu 302B, the user 114 may select the first combinatorial problem as the Knapsack problem.

It should be noted that the user-selection of the Knapsack problem is presented merely as an example. The first combinatorial optimization problem may correspond to any NP problem, such as, but not limited to, a graph coloring problem, a clique problem, an independent set problem, a clique cover problem, a minimax matching problem, a sub-set sum problem, a bin packing problem, a cutting stock problem, a number partition problem, a Hamiltonian cycle problem, a travelling salesman problem, a direct feedback set problem, a vehicle routing problem, a job shop scheduling problem, a generalized assignment problem, a quadratic assignment problem, a set packing problem, a set partition problem, a set covering problem, or a K-Plex problem.

The first UI element 302 may also include an objective function description box 302C, a default constraint description box 302D, a custom constraint description box 302E, and a data uploading box 302F as user-editable input fields. The processor 202 may determine a first objective function and a first set of constraints associated with the knapsack problem (i.e. the first combinatorial optimization problem). The determined first objective function and the determined first set of constraints may be displayed in the objective function description box 302C and the default constraint description box 302D, respectively. The user 114 may be provided with an option to modify the displayed first objective function and the first set of constraints by providing a second input. Additionally, or alternatively, the user 114 may also be provided with the option to add custom constraint(s) for the first combinatorial optimization problem by using the custom constraint description box 302E. The user 114 may choose to revise the first objective function, add/remove/revise constraints, add new variables, and the like. The concept of modification of the first objective function and/or the first set of constraints and addition of custom constraints is explained further, for example, in FIG. 5.

The processor 202 may further receive a set of datapoints as input for the first combinatorial optimization problem which includes the first objective function (as shown in the objective function description box 302C, for example) and one or more constraint functions (as shown in the default constraint description box 302D, for example). The user 114 may provide the set of datapoints by manually entering each datapoint in the data uploading box 302F or by uploading a file containing the set of datapoints using a browse button 302G. The browse button 302G may also be included in the first UI element 302.

Based on the first objective functions (and/or constraint function) and the set of datapoints, the processor 202 may generate a first quadratic unconstrained optimization (QUBO) formulation. The first QUBO may be considered as a seed formulation, which may be later on encoded based on a privacy preference of the user 114. If the user decides to not specify any privacy preference, the first QUBO formulation may be used for submission to the optimization solver machine 110 on the cloud optimization system 108.

By way of example, and not limitation, the user 114 may be provided with an option to select the privacy preference through the second UI element 304. The second UI element 304 may include a set of privacy protection levels, such as a first privacy protection level (P1), a second privacy protection level (P2), and a third privacy protection level (P3). Each privacy protection level may correspond to a particular strength of encoding and may be arranged in a sequential manner, with the first privacy protection level (P1) implementing a weak encoding method and the third privacy protection level (P5) implementing a stronger encoding method that the first privacy protection level (P1). Details of the set of privacy protection levels as privacy settings are provided, for example, in FIGS. 4, 5, 6, and 7.

The user 114 may select one or more privacy protection levels as a first privacy setting. Based on the first privacy setting, the processor 202 may encode the first QUBO formulation to generate a second QUBO formulation. The encoding may prevent the optimization solver machine 110 from recovering the confidential user data (such as the set of datapoints and/or constraints) from an encoded form of the first QUBO formulation. Thereafter, the user 114 may click the third UI element 306 (labelled as "submit"). The third UI element 306 may correspond to an option, which when selected, may finish the composition of the first combinatorial optimization problem and trigger a setting page (as shown in FIG. 3B), where the user 114 may preview the objective function (with updates, if applied) and associated constraint functions, and select options for submission of the encoded form of the first QUBO formulation to the optimization solver machine 110.

It should be noted that the electronic UI 300A is merely explained and illustrated as an example and should not be construed as limiting for the present disclosure. Other modifications, additions, or omissions may be made to the electronic UI 300A without departing from the scope of the present disclosure. It should be further noted that the electronic UI 300A may also include other UI elements, which have been omitted from the present disclosure for the sake of brevity.

Figure 3B:
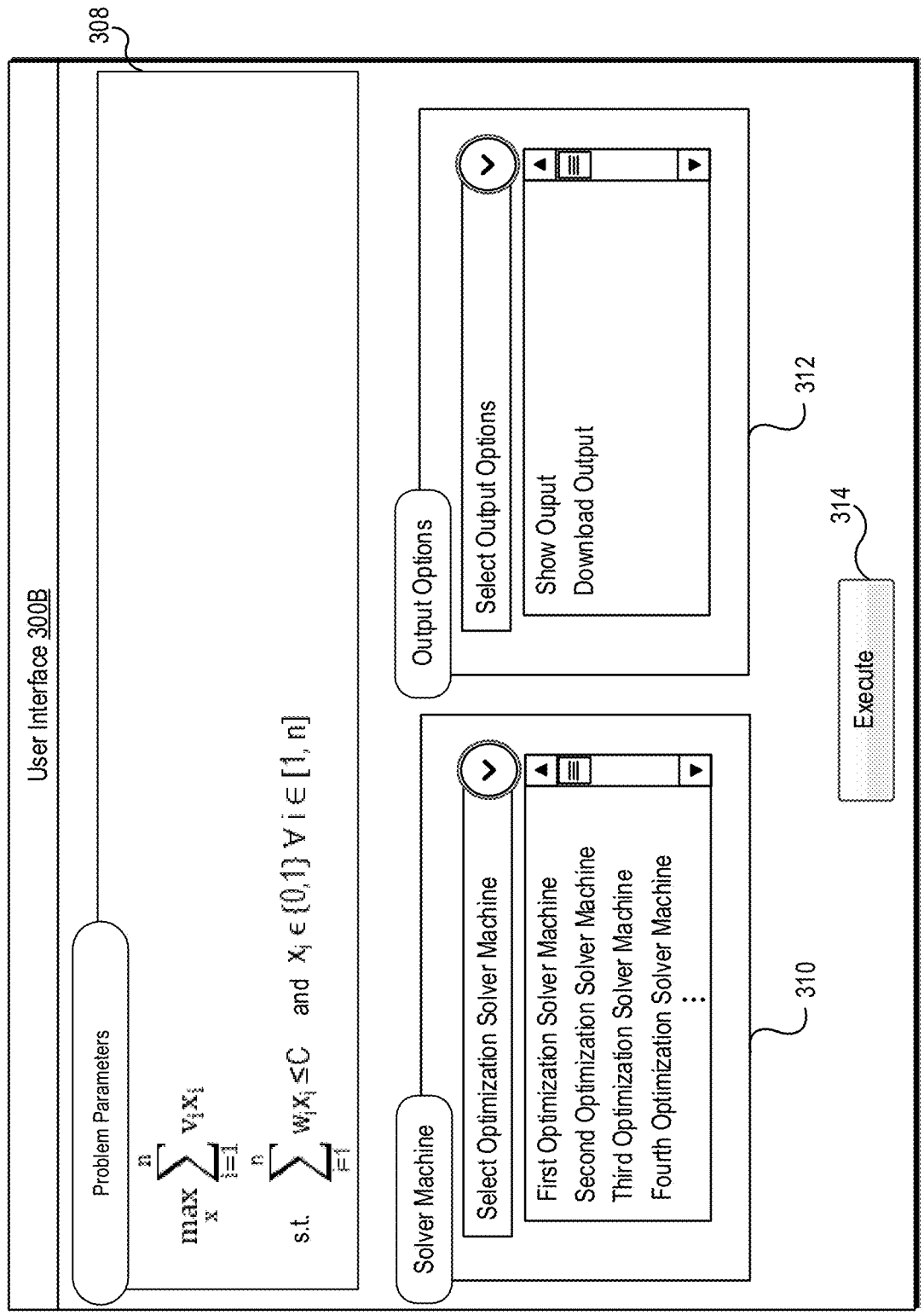
FIG. 3B is a diagram that illustrates an example user interface for user to submit the problem formulation to a suitable optimization solver machine.

FIG. 3B is a diagram that illustrates an example user interface for user to submit the problem formulation to a suitable optimization solver machine, according to at least one embodiment described in the present disclosure. FIG. 3B is explained in conjunction with elements from FIG. 1, FIG. 2, and FIG. 3A. With reference to FIG. 3B, there is shown an electronic UI 300B that may be an exemplary implementation of the electronic UI 106 of FIG. 1. On the electronic UI 300B, there is shown another set of UI elements, which may include a fourth UI element 308, a fifth UI element 310, a sixth UI element 312, and a seventh UI element 314.

The fourth UI element 308 (labelled as "Problem Parameters") may include a problem parameter description field 308A, which may include a final version of the first objective function and constraint functions (default constraints and custom constraints, if added by the user 114 via the electronic UI 300A) of the first combinatorial optimization problem.

The fifth UI element 310 (labelled as "Solver Machine") may correspond to an input field for selection of a suitable optimization solver machine for submission of the second QUBO formulation. As shown, the fifth UI element 310 may list a plurality of optimization solver machines, such as a first optimization solver machine, a second optimization solver machine, a third optimization solver machine, and a fourth optimization solver machine. Each of the plurality of optimization solver machines may be a part of a suitable cloud computing environment of an entity, which may or may not be different from an entity which offers the SDK on the user device 104. The user 114 may select one of the plurality of optimization solver machines as the optimization solver machine 110.

The sixth UI element 312 (labelled as "Output Options") may correspond to an input field to select whether to publish or download an output of the system 102, generated based on a solution of the second QUBO formulation from the selected optimization solver machine (selected through the fifth UI element 310). If the user 114 selects to show the output, the processor 202 may render the output on the display screen of the user device 104. Alternatively, If the user 114 selects to download the output, the processor 202 may store the generated output in the memory 204 or in the persistent data storage 206 of the system 102.

All the selections of the user 114 on all the UI elements (i.e. the first UI element 302, the second UI element 304, the third UI element 306, the fourth UI element 308, the fifth UI element 310, or the sixth UI element 312) may be saved as a setting in the memory 204 of the system 102. The setting may be useful for decoding the solution of the optimization solver machine 110 for the second QUBO formulation.

The seventh UI element 314 (labelled as "execute") may correspond to an option, which when selected, may submit the second QUBO formulation to the optimization solver machine 110 via one or more API calls. It should be noted here that the electronic UI 300B is merely explained and illustrated as an example and should not be construed as limiting for the present disclosure. Other modifications, additions, or omissions may be made to the electronic UI 300B without departing from the scope of the present disclosure. It should be further noted that the electronic UI 300B may also include other UI elements, which have been omitted from the present disclosure for the sake of brevity.

Figure 4A:
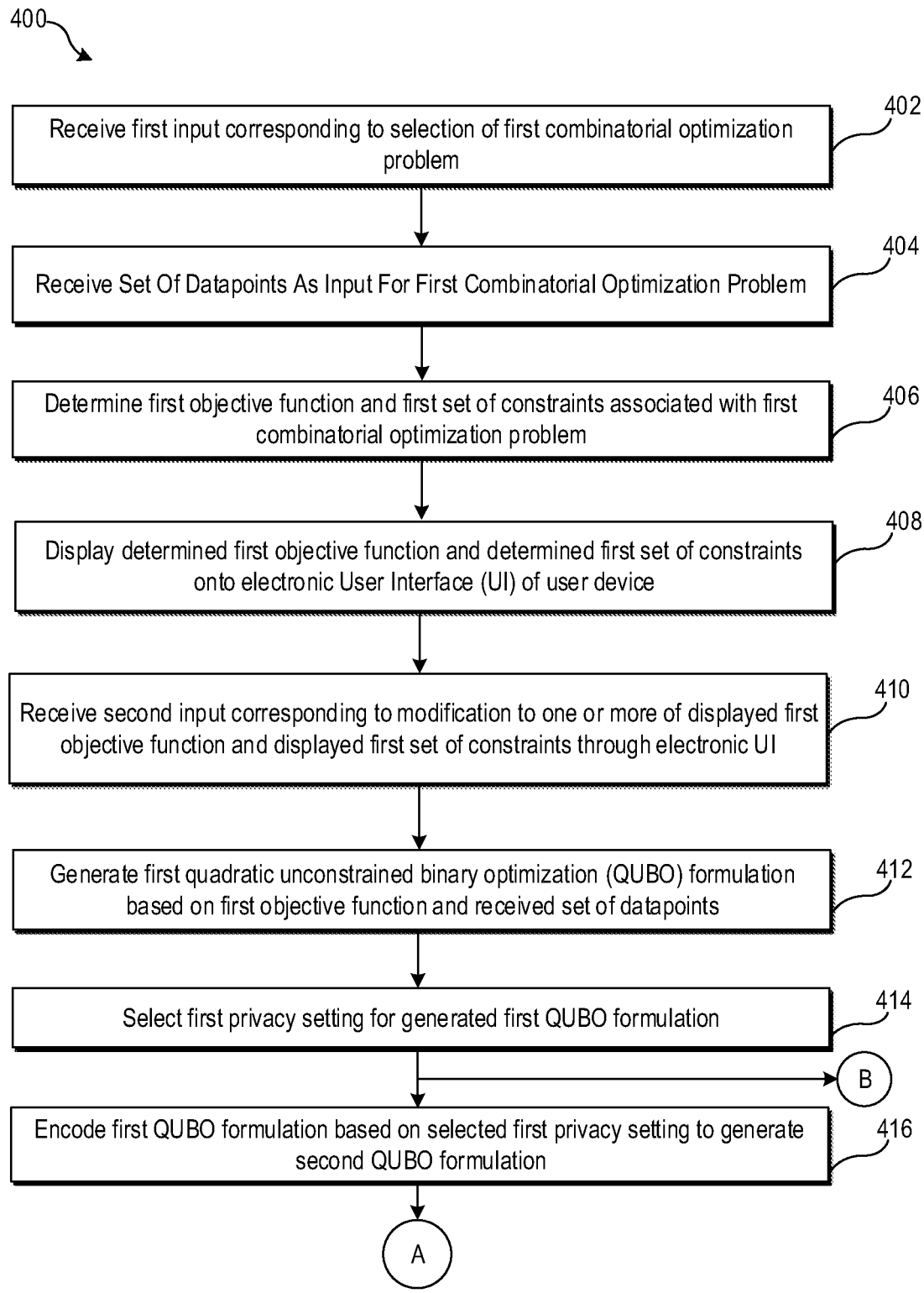
FIG. 4 is a flowchart of an example method for protection of data privacy on a cloud optimization system.
Figure 4B:
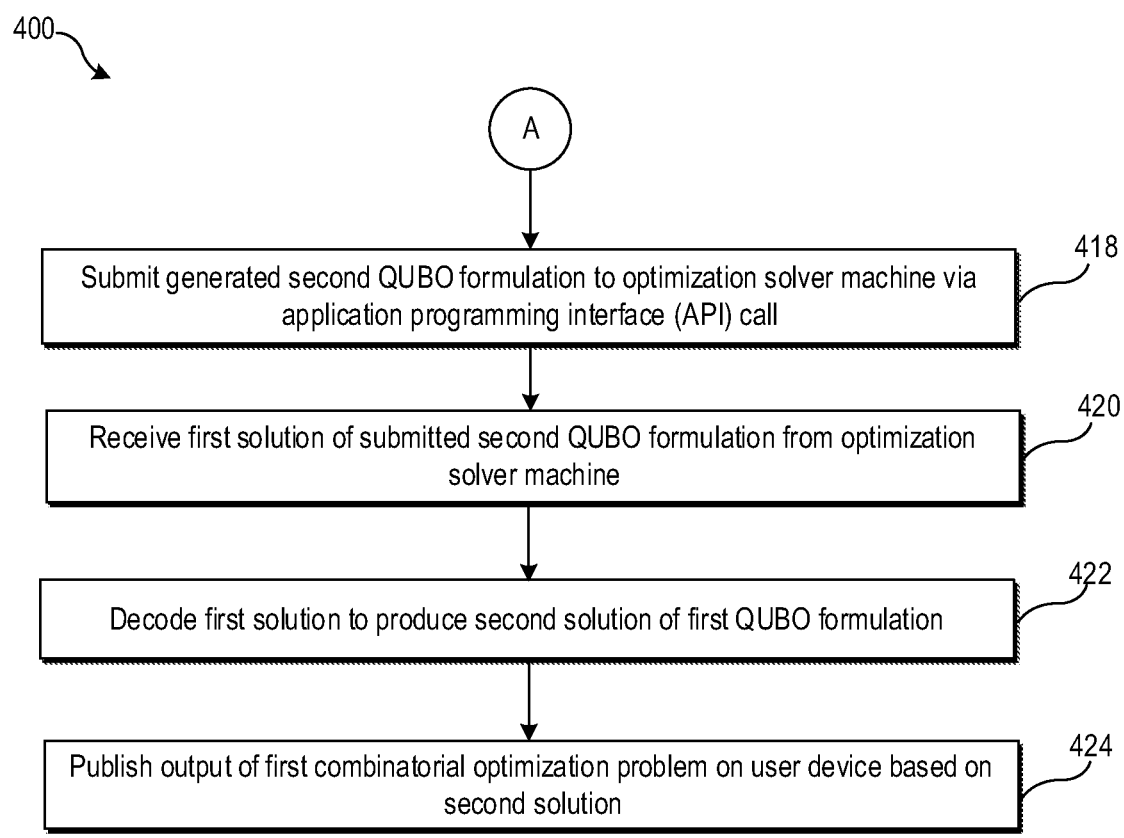

FIG. 4 is a flowchart of an example method for protection of data privacy on a cloud optimization system, arranged in accordance with at least one embodiment described in the present disclosure. FIG. 4 is explained in conjunction with elements from FIG. 1, FIG. 2, FIG. 3A, and FIG. 3B. With reference to FIG. 4, there is shown a flowchart 400. The example method illustrated in the flowchart 400 may start at 402 and may be performed by any suitable system, apparatus, or device, such as by the system 102 of FIG. 2.

At 402, a first input corresponding to a selection of a first combinatorial optimization problem may be received. The first input may be received via the electronic UI 106, displayed on the display screen of the user device 104. In one or more embodiments, the processor 202 may receive the first input corresponding to the selection of the first combinatorial optimization problem. Details of the first input are described, for example, in FIG. 3A.

At 404, a set of datapoints may be received as input for the first combinatorial optimization problem. In one or more embodiments, the processor 202 may receive the set of datapoints as input for the first combinatorial optimization problem. For example, for the Knapsack problem as the first combinatorial optimization problem, the set of datapoint may specify type of objects, number of objects, and weight/value of each object. The set of datapoints may be manually entered through the electronic UI 106 or may be uploaded via an upload option, as also described in FIG. 3A, for example.

At 406, a first objective function and a first set of constraints associated with the first combinatorial optimization problem may be determined. In one or more embodiments, the processor 202 may determine the first objective function and the first set of constraints associated with the first combinatorial optimization problem. The first objective function and the first set of constraints may be a default objective function and a set of default constraints, respectively. By way of example and not limitation, the first objective function associated with the knapsack problem is provided by equation (1), as follows:

$$\max_x \sum_{i=1}^{n} v_i x_i \qquad (1)$$

Where,
$v_i$ may represent the value associated with $i^{th}$ item, and
$x_i$ may represent an $i^{th}$ item.
The constraint/constraint function associated with the Knapsack problem is provided by equation (2), as follows:

$$\sum_{i=1}^{n} w_i x_i \leq C \qquad (2)$$

such that $x_i \in \{0, 1\} \forall i \in [1,n]$
where,
C may represent the total capacity of Knapsack, and
$w_i$ may represent a weight of $i^{th}$ item.

At 408, the determined first objective function and the determined first set of constraints may be displayed onto the electronic UI 106 of the user device 104. For example, the first objective function for the Knapsack problem is depicted in the objective function description box 302C of the electronic UI 300A. The determined first set of constraints may be displayed in the default constraint description box 302D.

At 410, a second input may be received. The second input may correspond to a modification of one or more of the displayed first objective function and the displayed first set of constraints (constraint functions). Such modifications may be performed through the electronic UI 106. By way of example, and not limitation, the second input may correspond to one or more of addition of a constraint to the determined first set of constraints, deletion of one or more constraints from the determined first set of constraints, modification of a first constraint of the determined first set of constraints or modification (addition/deletion) of variables of the determined first objective function.

For example, the first UI element 302 on the electronic UI 300A provides the user 114 with editing options to modify the default objective function, add/remove/revise constraints, or add new variables to customize the default objective function. New constraints may be added by adding one or more custom constraints in the custom constraint description box 302E. The deletion of at least one constraint and/or modification of a first constraint from the determined first set of constraints may be done via editing the displayed first set of constraints in the default constraint description box 302D. The modification of the determined first objective function may be done by editing the displayed first objective function in the objective function description box 302C. In some instances, the user 114 may input a generic math formulations and the SDK may create a QUBO formulation based on the input of the generic math formulation.

With the capability of customized problem formulations (i.e. modification of objective function and/or the first set constraints) within on-premise software development environment, possibly infinite number of customizations could be generated. Thus, it may be very difficult for the cloud optimization system 108 to figure out the NP problem and/or the modifications.

At 412, a first QUBO formulation may be generated. In one embodiment, the first QUBO formulation may be generated based on the first objective function and the received set of datapoints. In another embodiment, the first QUBO formulation may be generated based on the second input, which corresponds to the modification (at 410) of one or more of the modified objective function or the modified first set of constraints.

The first QUBO formulation may be a compatible input format for the optimization solver machine 110 and may include a square matrix of constants and parameters of a vector of binary decision variables that may correspond to the received set of datapoints (and slack variables). The first QUBO formulation may also include constraints associated with the first objective function of the first combinatorial optimization problem. A generalized QUBO formulation for any problem may be given by equation (3), as follows:

$$\min(y=x^T \cdot Q \cdot x) \qquad (3)$$

where x may represent the vector of binary decision variables and Q may be a square matrix of constants.

Using equations (1), and (2), the single inequality constraint of equation (2) may be converted to an equality constraint which is compliant with equation (3) by introducing a slack (integer) variable (s) and the first QUBO formulation may be given by equation (4), as follows:

$$Q = \sum_{i=1}^{n} -v_i x_i + P\left(\sum_{i=1}^{n} w_i x_i + s - C\right)^2 \qquad (4)$$

where,
P may represent a penalty term, and
s may represent the slack variable,
From equation (4), it can be seen that both the first objective function of equation (1) and the constraint function of equation (2) are incorporated in the first QUBO formulation of equation (4), The parameter (P) is also referred to as the Lagrange penalty parameter and its value should be set as a large value to generate large positive energy when a constraint of the first QUBO formulation is violated. The constraint may include an equality, an inequality, or a logical constraint. The penalty term(s) may be appended to allow the optimization solver machine 110 to avoid choosing an infeasible solution that may violate the first set of constraints associated with the first objective function. Specifically, the penalty term(s) may be appended such that the penalties may equal zero for feasible solutions and may equal a positive value for infeasible solutions of the discrete solution space. The penalty term(s) may be selected by considering that positive values of the penalty term(s) for the infeasible solutions may remain high enough to determine such solutions as infeasible. Also, the penalty term(s) may be chosen heuristically to obtain the global minimum energy, and not the local minimum energy, of the first QUBO formulation.

At 414, a first privacy setting for the generated first QUBO formulation may be selected. In an embodiment, the first privacy setting may correspond to a user input for selection of one or more privacy protection levels through the second UI element 304. The selection of privacy protection levels for encoding of the first QUBO formulation is described, for example, in FIGS. 6, 7, and 8.

At 416, the first QUBO formulation may be encoded based on the selected first privacy setting to generate a second QUBO formulation. In one or more embodiments, the processor 202 may encode the first QUBO formulation to generate the second QUBO formulation based on the selected first privacy setting.

For example, the encoding of the first QUBO formulation of equation (4) may include application of encoding methods, such as random assignment of values for penalty terms, appending redundant binary decision variables to the vector of binary decision variables (x), rearrangement of the vector of binary decision variables according to a random sequence setting, or a combination thereof. After the application of the such encoding methods, the square matrix (Q' (read as Q-prime) may be calculated (or recalculated, if previously calculated). The encoding method may be different for each privacy protection level and is described, for example, in FIG. 6, FIG. 7, and FIG. 8.

In some embodiments, the first privacy setting may include a single privacy protection level and therefore, the encoding of the first QUBO formulation may be performed based on the single privacy protection level. In some other embodiments, the first privacy setting may include a selection of multiple privacy protection levels. In such a case, the first QUBO formulation may be encoded based on a sequential application of multiple encoding methods (as described in FIG. 8).

In some embodiments, the generated first QUBO formulation may be displayed on the electronic UI 106 of the user device 104. In some other embodiments, the generated first QUBO formulation may be displayed along with the second QUBO formulation on the electronic UI 106 to allow the user 114 to review differences between the first QUBO formulation and the second QUBO formulation.

At 418, the generated second QUBO formulation may be submitted to the optimization solver machine 110 via an application programming interface (API) call. By way of example, and not limitation, for the Knapsack problem, the calculated square matrix (Q') of constants may be submitted via the API call to the optimization solver machine 110. In an embodiment, the submission of information describing the first combinatorial optimization problem may be precluded from the optimization solver machine 110. More specifically, information, such as the type of NP problem, may not be included with the API call to the optimization solver machine 110. By doing so, the selection of the type of problem may be kept as a secret at on-premise software environment. Without the knowledge of the type of problem, it may be difficult for the cloud optimization system 108 to figure out the type of problem just from the submitted square matrix (Q') of constants (i.e. the second QUBO formulation).

The optimization solver machine 110 may solve the second QUBO formulation by application of searching methods and/or meta-heuristic methods, such as quantum annealing, to obtain the first solution of the submitted second QUBO formulation. Specifically, to search for the first solution (i.e. values of the vector of binary decision variables (x)), the energy of the second QUBO formulation may be minimized. The first solution may be optimal (or near optimal) and may be searched from a discrete solution space.

At 420, the first solution of the submitted second QUBO formulation may be received from the optimization solver machine 110. The first solution may include binary values for a first set of binary decision variables (x) of the second QUBO formulation. By way of example and not limitation, in case of the knapsack problem, for each datapoint (or item) of the received set of datapoints, there may be an associated decision variable in the first solution, value of which may indicate whether that item is to be included in the knapsack or not. Depending on the first privacy setting, i.e. the selected privacy protection levels, the decoding of the first solution may be performed.

At 422, the first solution may be decoded to produce a second solution of the first QUBO formulation. The decoding of the first solution is described, for example, in FIG. 6, FIG. 7, and FIG. 8.

At 424, an output of the first combinatorial optimization problem may be published on the user device 104. The output of the first combinatorial optimization problem may be produced based on the second solution (i.e. the decoded solution). The second solution may include the values of the binary decision variables for the set of datapoints. In one or more embodiments, the processor 202 may publish the output of the first combinatorial optimization problem on the user device 104 based on the second solution.

Control may pass to end. Although the flowchart 400 is illustrated as discrete operations, such as 402, 404, 406, 408, 410, 412, 414, 416, 418, 420, 422, and 424; however, in certain embodiments, such discrete operations may be further divided into additional operations, combined into fewer operations, or eliminated, depending on the particular implementation.

Figure 5:
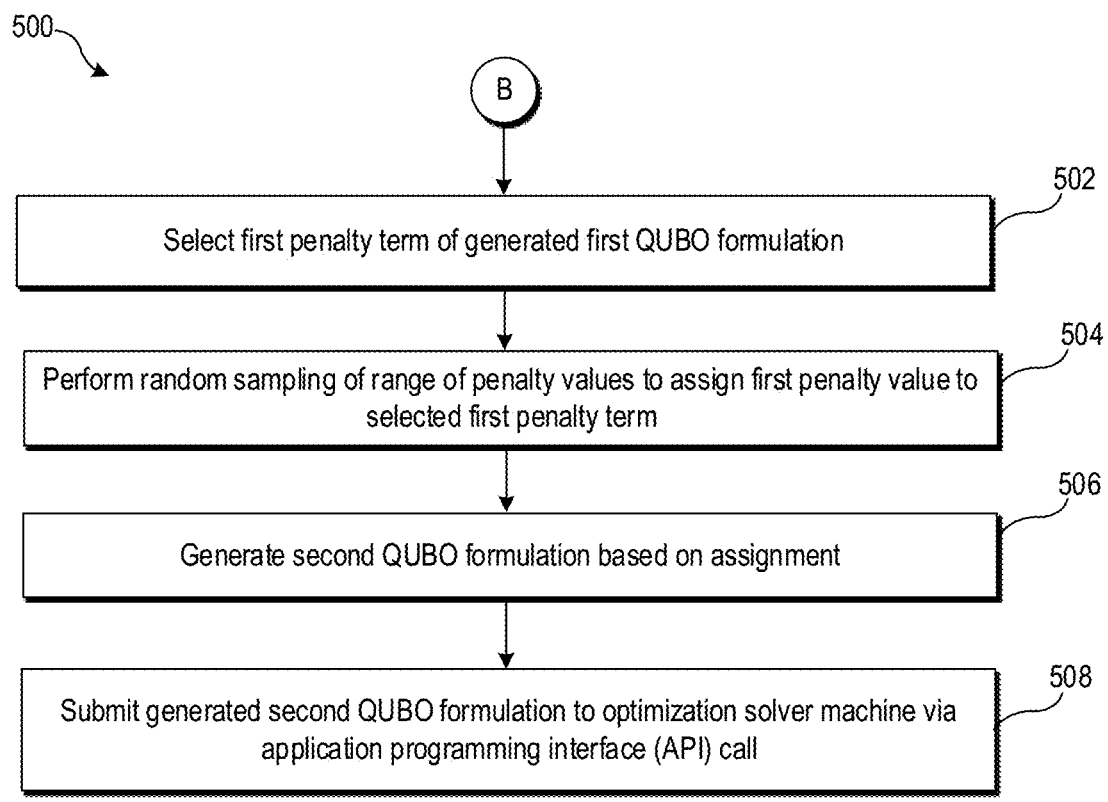
FIG. 5 is a flowchart of an example method of protection of data privacy on cloud optimization systems.
Figure 6:
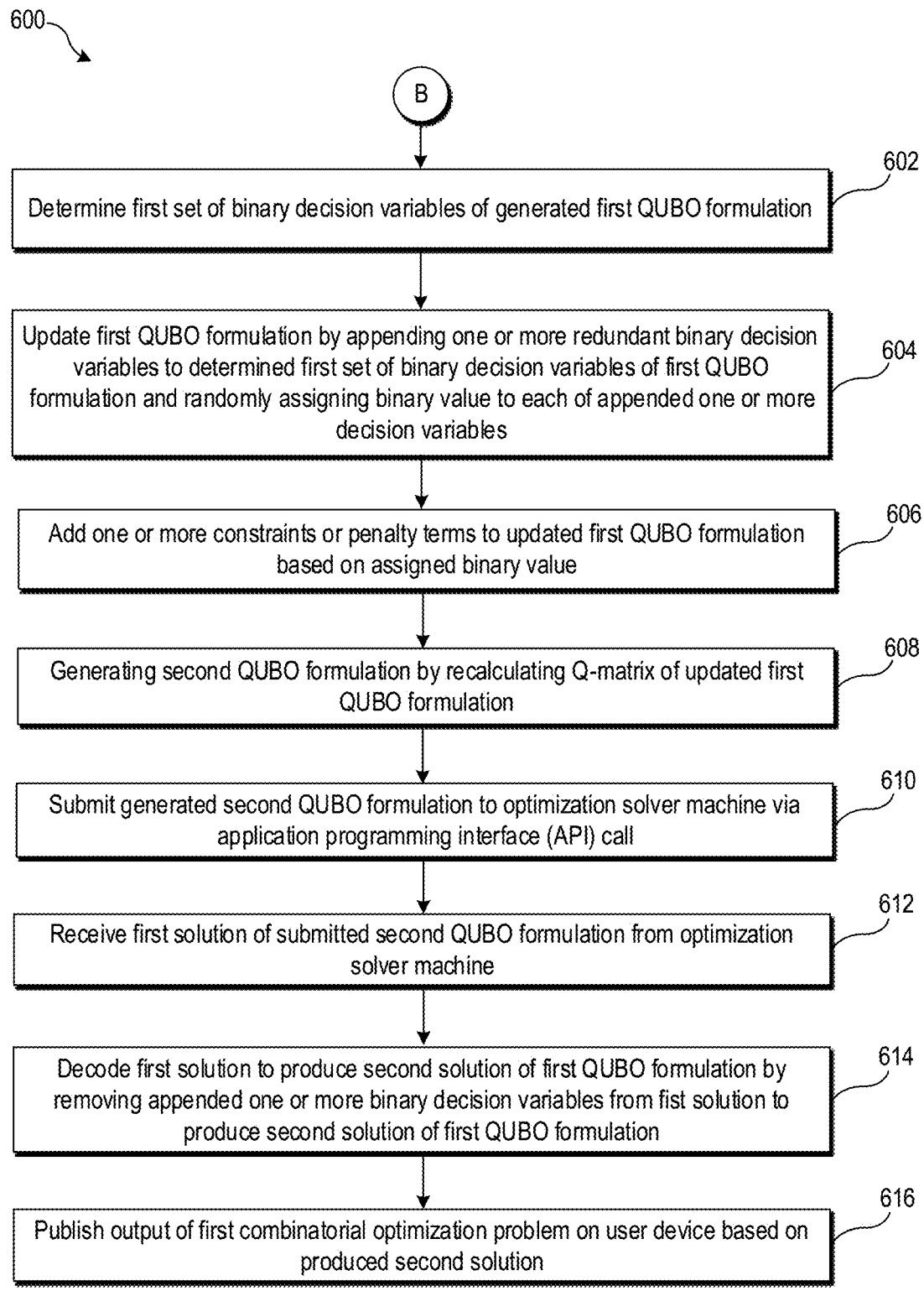
FIG. 6 is a flowchart of an example method of protection of data privacy on cloud optimization systems for a particular privacy protection level.

FIG. 5 is a flowchart of an example method of protection of data privacy on cloud optimization systems, arranged in accordance with at least one embodiment described in the present disclosure. FIG. 6 is explained in conjunction with elements from FIGS. 1, 2, 3A, 3B, and 4. With reference to FIG. 5, there is shown a flowchart 500. The example method illustrated in the flowchart 500 may describe the encoding method associated with the selection of the first privacy setting and may be performed by any suitable system, apparatus, or device, such as by the system 102 of FIG. 2.

At 502, a first penalty term of the generated first QUBO formulation may be selected. In one or more embodiments, the processor 202 may select the first penalty term of the generated first QUBO formulation. For example, from equation (4) of FIG. 4 for the Knapsacks problem, the first penalty term P may be selected from the first QUBO formulation. By default, the first penalty term may be assigned a value (p) for all the constraints of the first QUBO formulation. The value (p) for the first penalty term (P) may be considered as a reference and then expanded to a range of penalty values [p−δp, p+δp], where δp may be selected randomly or heuristically.

At 504, random sampling of the range of penalty values may be performed. Specifically, the range of penalty values [p−δp, p+δp] may be randomly sampled to assign a first penalty value (p') from the range to the selected first penalty term (P). It should be noted that the value of δp may be chosen in such a way that the penalty value (p') may have little to no impact on the solution of the second QUBO formulation. As one example, in equation (4) for Knapsacks, there are "n" instances of the first penalty term (P), each of which may be randomly assigned a penalty value (p') from among the range of penalty values [p−δp, p+δp]. As another example, the first QUBO formulation for Traveling Salesman Problem (TSP) is provided in equation (5), as follows:

$$Q = \sum_{k=1}^{n}\sum_{i=1}^{n}\sum_{j=1}^{n} d_{ij}x_{k,i}x_{k+1,j} + \sum_{k=1}^{n} P_k\left(\sum_{i=1}^{n} x_{k,i} - 1\right)^2 + \sum_{i=1}^{n} P_i\left(\sum_{k=1}^{n} x_{k,i} - 1\right)^2 \quad (5)$$

The first QUBO formulation is based on the objective functions and constraints for the TSP, which are provided in equations (6), (7), and (8), as follows:

$$\min_{x} \sum_{k=1}^{n}\sum_{i=1}^{n}\sum_{j=1}^{n} d_{ij}x_{k,i}x_{k+1,j} \quad (6)$$

Such that $$\sum_{i=1}^{n} x_{k,i} = 1 \forall k = [1, n] \quad (7)$$

$$\sum_{k=1}^{n} x_{k,i} = 1 \forall i = [1, n] \quad (8)$$

$$x_{k,i} \in 0, 1 \forall k, i = [1, n]$$

Equations (7) and (8) depict two equality constraints. From equation (5), the number of these equality constraints is equal to 2n. Each of these 2n constraints may be assigned a random penalty value from among the range of penalty values.

At 506, a second QUBO formulation may be generated. The second QUBO formulation may be generated based on assignment of the first penalty value to the selected first penalty term of the first QUBO formulation. In the second QUBO formulation, each constraint may be associated with a random penalty value, selected after random sampling of the range of penalty values.

At 508, the generated second QUBO formulation may be submitted to the optimization solver machine 110 machine via an API call. In one or more embodiments, the processor 202 may be configured to submit the generated second QUBO formulation to the optimization solver machine 110 via the API call. Details about the submission of the second QUBO formulation is described, for example, in FIG. 4.

It should be noted that different penalty values may be assigned randomly for each constraint so that these penalty values do not affect the first solution of the second QUBO formulation, which is obtained after the second QUBO formulation is submitted to the optimization solver machine 110. However, the on-premise software development environment may record these random penalty values for debugging purposes. Certainly, these random penalty values may not be disclosed to the cloud optimization system 108.

As the first solution of the second QUBO formulation may not be affected by the random assignment, there may not be a need for decoding of the first solution. In such a case, the first solution of the second QUBO formulation may be considered as the solution of the first QUBO formulation and may be, therefore, used to produce a result of the first combinatorial optimization problem. In the result, values of the binary decision variables in the first solution may be mapped to the set of datapoints, which the user 114 may have specified while composing the first combinatorial optimization problem through the electronic UI 106 (for example, as described in FIG. 3A).

Control may pass to end. Although the flowchart 500 is illustrated as discrete operations, such as 502, 504, 506, 508; however, in certain embodiments, such discrete operations may be further divided into additional operations, combined into fewer operations, or eliminated, depending on the particular implementation.

FIG. 6 is a flowchart of an example method of protection of data privacy on cloud optimization systems for a particular privacy protection level, arranged in accordance with at least one embodiment described in the present disclosure. FIG. 6 is explained in conjunction with elements from FIGS. 1, 2, 3A, 3B, 4, and 5. With reference to FIG. 6, there is shown a flowchart 600. The example method illustrated in the flowchart 600 may describe the encoding/decoding method associated with the selection of the first privacy setting and may be performed by any suitable system, apparatus, or device, such as by the system 102 of FIG. 2.

At 602, a first set of binary decision variables of the generated first QUBO formulation (generated at 412) may be determined. In one or more embodiments, the processor 202 may determine the first set of binary decision variables of the generated first QUBO formulation. For example, from equation (4) of FIG. 4, it can be seen that there are n number of binary decision variables in "x" (i.e. the vector of binary decision variables) and one slack variable (s) for the Knapsacks problem.

At 604, the first QUBO formulation may be updated. Specifically, the first QUBO formulation may be updated by appending one or more redundant binary decision variables to the determined first set of binary decision variables of the first QUBO formulation and by randomly assigning a binary value to each of the appended one or more binary decision variables. In one or more embodiments, the processor 202 may update the first QUBO formulation by appending the one or more redundant binary decision variables to the determined first set of binary decision variables of the first QUBO formulation and randomly assigning a binary value to each of the appended one or more binary decision variables.

By way of example, and not limitation, the first set of binary decision variables of the generated first QUBO formulation may include "n" number of binary decision variables ($x_1$, $x_2$, $x_3$, ... $x_n$). One or more redundant binary decision variables ($x_r$) may be appended or added to the first set of binary decision variables. A binary value may be further assigned to each redundant binary decision variable ($x_r$), The binary value may be either 0 or 1. The first QUBO formulation, as provided by the equation (1), may be updated to equation (9) as follows:

$$\min(y = z^T \cdot Q \cdot z) \quad (9)$$

where,
z is the vector of n+k binary decision variables ($x_1$, $x_2$, $x_3$, ... $x_n$, $x_{r_1}$, ..., $x_{r_k}$)
And k is the number of redundant binary decision variables.
And Q is a square matrix of constants.

For example, for the Knapsacks problem, the generated first QUBO formulation as provided by equation (4) may be updated to equation (10):

$$Q \text{ or } E_1 = \sum_{i=1}^{n+k} v_i z_i + \sum_{i=1}^{n+k} p(w_i z_i - w_i z_i C) \qquad (10)$$

At 606, one or more constraints or penalty terms may be added to the updated first QUBO formulation. These constraint(s) may be added based on the assigned binary value to the one or more appended binary decision variable ($x_r$). In an embodiment, when the appended binary decision variable $x_r$ is assigned a "0", a new constraint $x_i x_r = 0$ may be added to the first set of constraints associated with the selected first combinatorial optimization problem. As a result of adding the new constraint, the first QUBO formulation may be updated to add a new penalty term ($P_{ir} x_i x_r$) that may be associated with the added constraint. In another embodiment, when the appended binary decision variable ($x_r$) is assigned a "1", a new constraint $x_r = 1$ may be added to the first set of constraints associated with the selected first combinatorial optimization problem. As a result of adding the new constraint, the first QUBO formulation may be updated to add a new penalty term ($P_r (x_r - 1)^2$) that may be associated with the added constraint. In some embodiments, penalty values may be randomly assigned to all the penalty terms (including the new penalty term) from the sample range of penalty values (as described at 504).

At 608, the second QUBO formulation may be generated. The second QUBO formulation may be generated by recalculating the Q-matrix (i.e. the square matrix of constants) of the updated first QUBO formulation. The values of the Q-matrix may depend on the input datapoints and constraint functions of the combinatorial optimization problem. The Q-matrix may be a symmetric matrix or an upper triangular matrix and may be required by the optimization solver machine 110 to determine a solution for the first combinatorial optimization problem.

By way of example, and not limitation, for the knapsack problem, if one or more redundant variable $x_r$ are assigned with a binary value of "1", a random weight $w_r$ and a random value $v_r$ may allocated with the redundant variable $x_r$. The capacity C of the knapsack may also be increased to $C+w_r$. Since, the Q-matrix depends on input parameters (i.e. parameters on RHS of equation (4)), the Q-matrix may be recalculated when equation (4) is updated to equation (10). In one or more embodiments, after the addition of one or more constraints or penalty terms at 606, the second QUBO formulation may be generated by recalculating the Q-matrix of the updated first QUBO formulation.

At 610, the generated second QUBO formulation may be submitted to the optimization solver machine 110 via an API call. Details about the submission of the second QUBO formulation are provided, for example, in FIG. 4.

At 612, a first solution of submitted second QUBO formulation from may be received from the optimization solver machine 110. In one or more embodiments, the processor 202 may receive the first solution of the submitted second QUBO formulation from the optimization solver machine 110. For example, for equation (10), the first solution may include values for the vector (z) of n+1 binary decision variables ($x_1, x_2, x_3, \ldots x_n, x_{r_1}, \ldots, x_{r_k}$), where values for ($x_1, x_2, x_3, \ldots x_n$) may be the actual solution for the QUBO formulation and the value of $x_r$ may be redundant.

At 614, the first solution may be decoded to produce a second solution of first QUBO formulation. The first solution may be decoded by removing the appended one or more binary decision variables from the first solution (at 612) to produce the second solution. For example, from the first solution that includes the vector (z) of n+k binary decision variables ($x_1, x_2, x_3, \ldots x_n, x_{r_1}, \ldots, x_{r_k}$), the value of $x_r$ may be removed to produce the second solution which includes the values ($x_1, x_2, x_3, \ldots x_n$).

At 616, the output of the first combinatorial optimization problem may be published on the user device 104. The output may be generated based on the produced second solution at 614. Details about the publishing of the output is described, for example, in FIG. 4.

Control may pass to end. Although the flowchart 600 is illustrated as discrete operations, such as 602, 604, 606, 608, 610, 612, 614, and 616; however, in certain embodiments, such discrete operations may be further divided into additional operations, combined into fewer operations, or eliminated, depending on the particular implementation.

Figure 7:
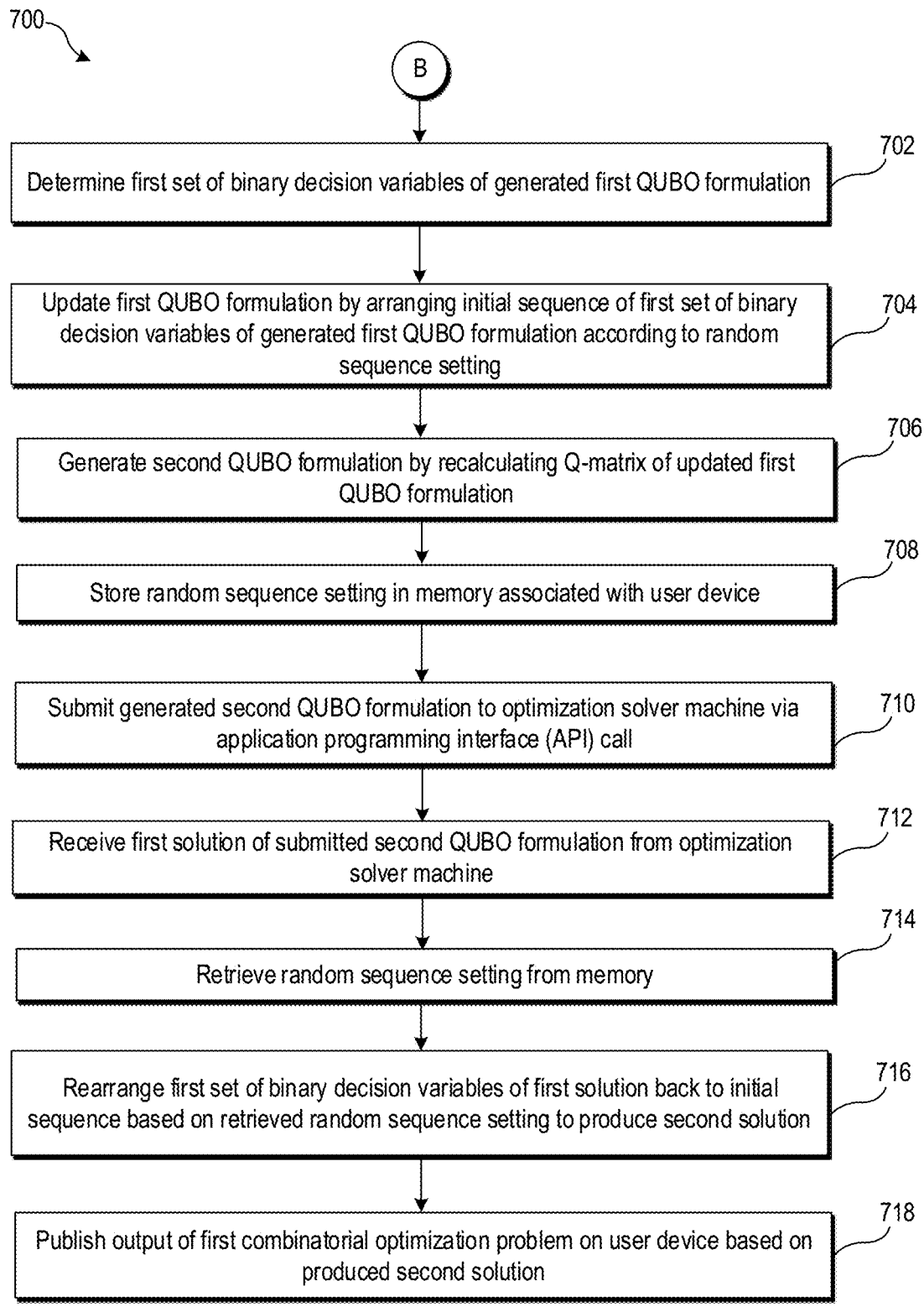
FIG. 7 is a flowchart of an example method of protection of data privacy on cloud optimization systems for a particular privacy protection level.

FIG. 7 is a flowchart of an example method of protection of data privacy on cloud optimization systems for a particular privacy protection level, arranged in accordance with at least one embodiment described in the present disclosure. FIG. 7 is explained in conjunction with elements from FIGS. 1, 2, 3A, 3B, 4, 5, and 6. With reference to FIG. 7, there is shown a flowchart 700. The example method illustrated in the flowchart 702 may describe the encoding/decoding method associated with the selection of the first privacy setting and may be performed by any suitable system, apparatus, or device, such as by the system 102 of FIG. 1.

At 702, a first set of binary decision variables in generated first QUBO formulation may be determined. In one or more embodiments, the processor 202 may determine the first set of binary decision variables of generated the first QUBO formulation. For example, from equation (4) of FIG. 4, it can be seen that there are n number of binary decision variables in "x" (i.e. the vector of binary decision variables) and one slack variable (s) for the Knapsacks problem.

At 704, the first QUBO formulation may be updated by arranging an initial sequence of the first set of binary decision variables of the generated first QUBO formulation according to a random sequence setting. The random sequence setting may be generated by the system 102 by randomly sorting variable positions of the first set of binary decision variables. In some embodiments, a random seed may be used to generate the random sequence setting for the first set of binary decision variables. The updated first QUBO formulation may contain the first set of binary decision variables, where position of the variables may be set according to the random sequence setting, which may be different as compared to the initial sequence in the first QUBO formulation. For example, if the first set of "n" binary decision variables may be in an initial sequence of ($x_1, x_2, x_3 \ldots x_n$). According to the random sequence setting, the first set of binary decision variables may be rearranged as ($x_2, x_1, x_n, \ldots x_3$).

At 706, a second QUBO formulation may be generated by calculating (or recalculating) a Q-matrix of the updated first QUBO formulation. At 708, the random sequence setting may be stored in the memory 204 and may be retrieved during the decoding process. In some embodiments, the random seed may also be stored in the memory 204.

At 710, the generated second QUBO formulation may be submitted to the optimization solver machine 110 via an API call. Details about the submission of the second QUBO formulation are provided, for example, in FIG. 4.

At 712, a first solution of the submitted second QUBO formulation may be received from the optimization solver machine 110. For example, the first solution may include values for the vector (x) of n binary decision variables ($x_2$, $x_1$, $x_n$, ... $x_3$). These values may have to rearranged to obtain the actual solution for the first QUBO formulation.

At 714, the stored random sequence setting may be retrieved from the memory 204. The random sequence setting maybe retrieved to decode the first solution. In some embodiments, the random seed may also be retrieved from the memory 204.

At 716, the first set of binary decision variables of the first solution may be rearranged back to the initial sequence based on the retrieved random sequence setting. The rearrangement may produce a second solution for the first QUBO formulation. For example, the first solution of the binary decision variables may be (0, 1, 1 . . . 0) and the random sequence may be ($x_2$, $x_1$, $x_n$, . . . $x_3$). The first solution may be rearranged back to the initial sequence, i.e. ($x_1$, $x_2$, $x_3$ . . . $x_n$) to produce the second solution as (1, 0, 0 . . . 1).

At 718, the output of the first combinatorial optimization problem may be published on the user device 104. The output may be produced based on the second solution. Details about publishing the output is described, for example, in FIG. 4.

Control may pass to end. Although the flowchart 700 is illustrated as discrete operations, such as 702, 704, 706, 708, 710, 712, 714, 716, and 718; however, in certain embodiments, such discrete operations may be further divided into additional operations, combined into fewer operations, or eliminated, depending on the particular implementation.

Figure 8A:
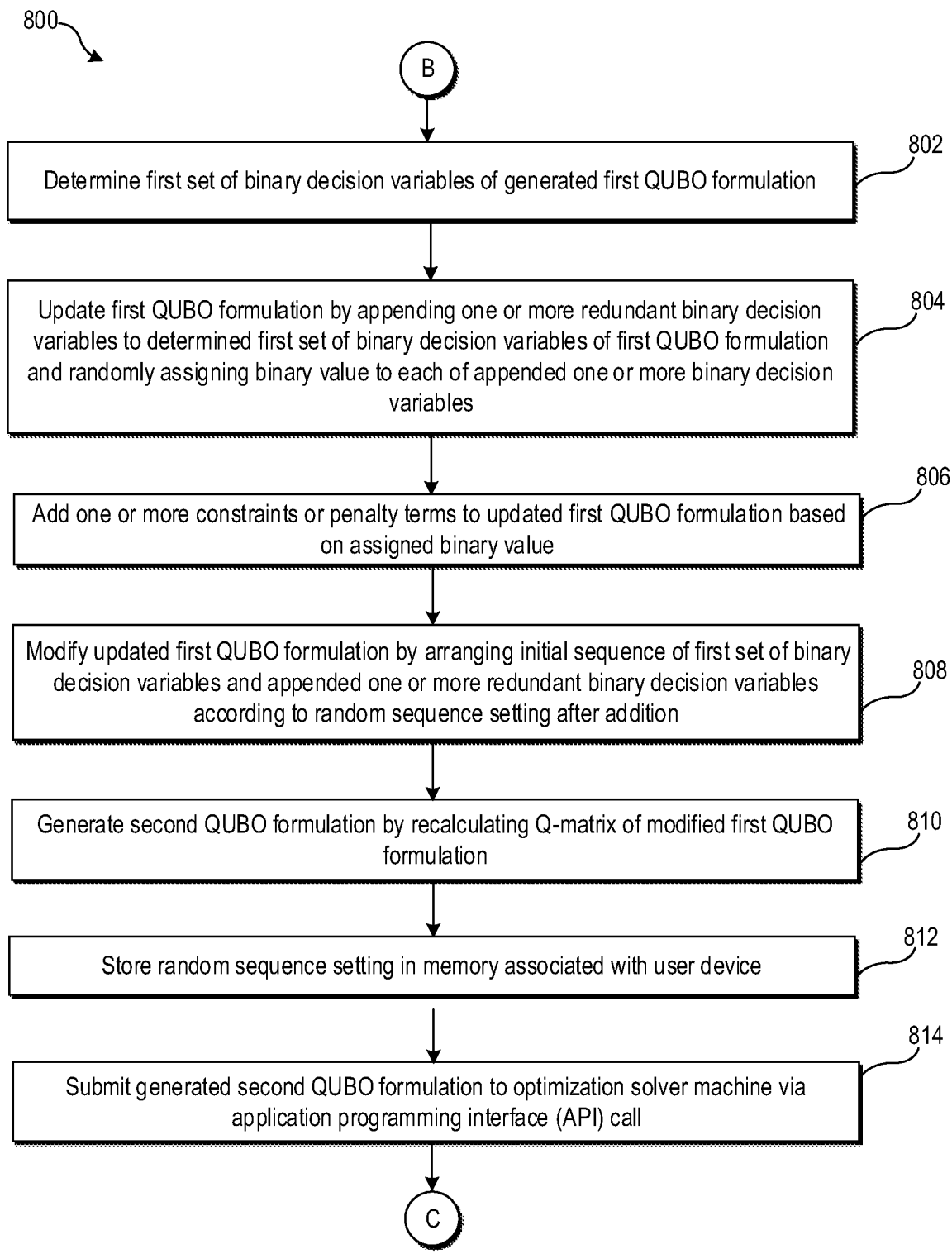
FIG. 8 is a flowchart of an example method of protection of data privacy on cloud optimization systems based on a combination of privacy protection levels of FIG. 6 and FIG. 7, all according to at least one embodiment described in the present disclosure.
Figure 8B:
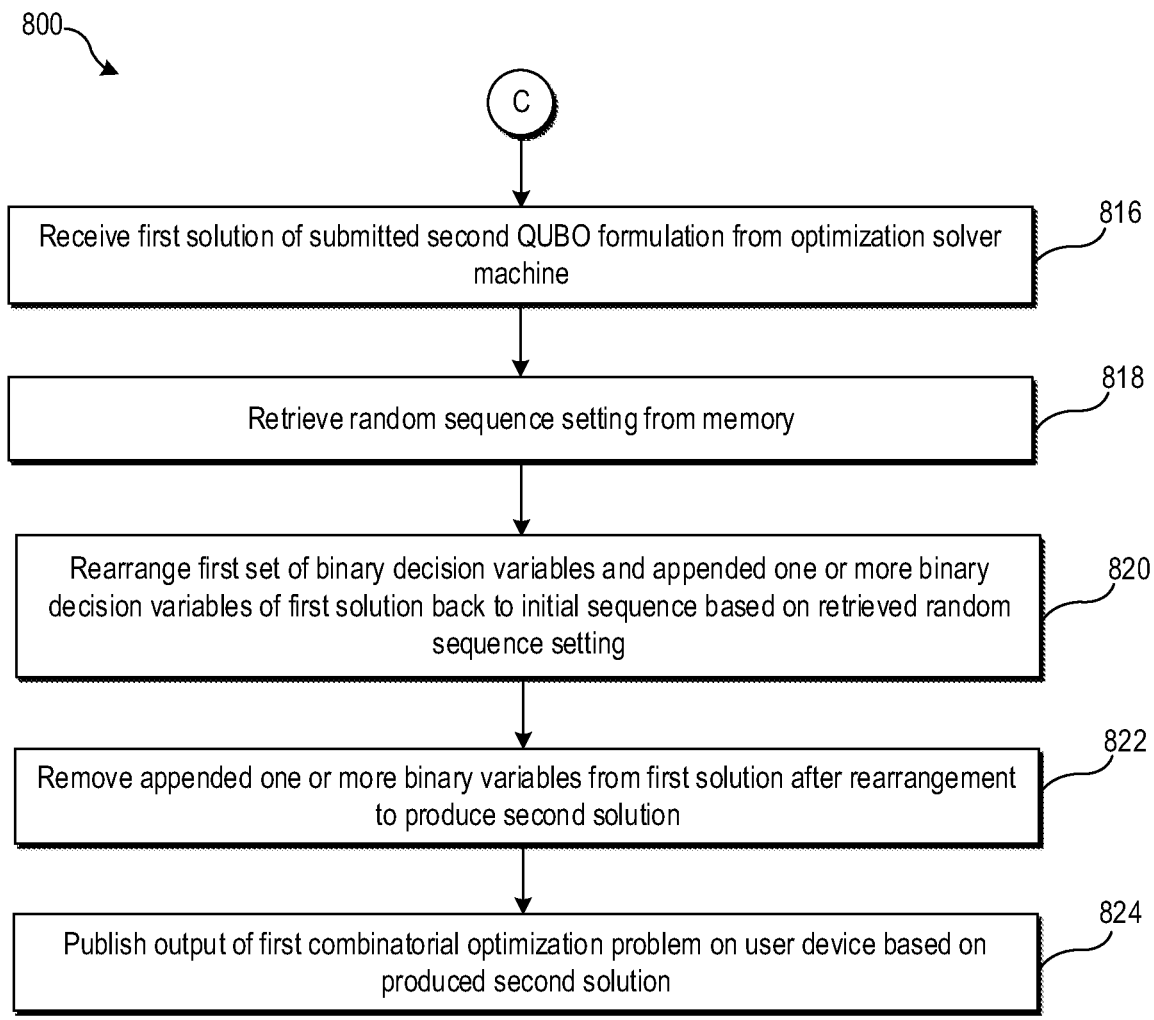

FIG. 8 is a flowchart of an example method of protection of data privacy on cloud optimization systems based on a combination of privacy protection levels of FIG. 6 and FIG. 7, arranged in accordance with at least one embodiment described in the present disclosure. FIG. 8 is explained in conjunction with elements from FIGS. 1, 2, 3A, 3B, 4, 5, 6, and 7. With reference to FIG. 8, there is shown a flowchart 800. The example method illustrated in the flowchart 800 may describe the encoding/decoding method associated with the selection of the first privacy setting and may be performed by any suitable system, apparatus, or device, such as by the system 102 of FIG. 1.

At 802, a first set of binary decision variables of the generated first QUBO formulation may be determined. In one or more embodiments, the processor 202 may be configured to determine the first set of binary decision variables of generated the first QUBO formulation. Determination of the first set of binary decision variables is described at 602 of FIG. 6, for example.

At 804, the first QUBO formulation may be updated. The first QUBO formulation may be updated by appending one or more redundant binary decision variables to the determined first set of binary decision variables of the first QUBO formulation and by randomly assigning a binary value to each of the appended one or more binary decision variables. By way of example and not limitation, if the first QUBO formulation includes "n" binary decision variables ($x_1$, $x_2$, $x_3$ . . . $x_n$), then after appending a redundant binary variable $x_r$ and assigning binary value to the redundant binary variable, the vector of binary decision variables may be ($x_1$, $x_2$, $x_3$ . . . $x_n$, $x_r$). The process of updating the first QUBO formulation is described in detail at 604, for example.

At 806, one or more constraints or penalty terms may be added to the updated first QUBO formulation. These constraints may be added based on the assigned binary value to the redundant binary decision variables. Details about the addition of the constraints or the penalty terms to the updated first QUBO formulation are provided at 606 of FIG. 6.

At 808, the updated first QUBO formulation may be modified by arranging an initial sequence of the first set of binary decision variables and the appended one or more redundant binary decision variables according to a random sequence setting. The updated first QUBO formulation may be modified after the addition of one or more constraints or penalty terms to the updated first QUBO formulation. For example, the updated vector of binary decision variables (including the redundant variable) ($x_1$, $x_2$, $x_3$ . . . $x_n$, $x_r$) may be rearranged as ($x_2$, $x_n$, $x_r$ . . . $x_3$, $x_1$).

At 810, a second QUBO formulation may be generated by recalculating the Q-matrix of the modified first QUBO formulation. In one or more embodiments, the processor 202 may generate the second QUBO formulation by recalculating Q-matrix of the updated first QUBO formulation.

At 812, the random sequence setting may be stored in the memory 204. In one or more embodiments, the processor 202 may store the random sequence setting in the memory 204. The random sequence setting may be stored as it may be retrieved during the decoding process. In some embodiments, a random seed may also be stored in the memory 204. The random seed (or a private key) may be used to generate all the essential random sequence setting as well as to recover the first solution from the optimization solver machine 110.

At 814, the generated second QUBO formulation may be submitted to the optimization solver machine 110 via an API call. In one or more embodiments, the processor 202 may submit the generated second QUBO formulation to the optimization solver machine 110 via the API call. Details about the submission of the second QUBO formulation is described, for example, in FIG. 4.

At 816, a first solution of the submitted second QUBO formulation may be received from the optimization solver machine 110. In one or more embodiments, the processor 202 may receive the first solution of the submitted second QUBO formulation from the optimization solver machine 110. For example, the first solution of the binary decision variables may include a vector of binary values (0, 1, 1 . . . 0, 0) for the random sequence ($x_2$, $x_n$, $x_r$ . . . $x_3$, $x_1$).

At 818, the stored random sequence setting may be retrieved from the memory 204. The random sequence setting may be retrieved to decode the received first solution.

At 820, the first set of binary decision variables and the appended one or more binary decision variables of the first solution may be rearranged back to the initial sequence based on the retrieved random sequence setting at 818. In one or more embodiments, the processor 202 may rearrange the first set of binary decision variables and the appended one or more binary decision variables of the first solution back to the initial sequence based on the retrieved random sequence setting. For example, the binary decision variables in the first solution (0, 1, 1 . . . 0, 0) may be rearranged as (0, 0, 0 . . . 1, 1), which is the initial sequence of the binary decision variables.

At 822, the appended one or more binary variables may be removed from the first solution after rearrangement to produce a second solution. In one or more embodiments, the processor 202 may remove the appended one or more binary variables from the first solution after rearrangement to produce the second solution. For example, the binary decision variables may be rearranged as (0, 0, 0 . . . 1, 1) and the value (1) of the redundant variable ($x_1$) may be removed to obtain the second solution.

At 824, the output of the first combinatorial optimization problem may be published on the user device 104. The output may be based on the produced second solution at 822. In one or more embodiments, the processor 202 may publish the output of the first combinatorial optimization problem on the user device 104 based on the second solution. The details about publishing the output is described, for example, in FIG. 4.

Control may pass to end. Although the flowchart 800 is illustrated as discrete operations, such as 802, 804, 806, 808, 810, 812, 814, 816, 818, 820, 822 and 824; however, in certain embodiments, such discrete operations may be further divided into additional operations, combined into fewer operations, or eliminated, depending on the particular implementation.

Although the present disclosure describes the encoding of the QUBO formulation for protection of users' data privacy, the present disclosure may also be applicable to an Ising formulation, which is a transformation of a QUBO formulation. Similar to the QUBO formulation, the Ising formulation may also be encoded before the formulation is submitted to an Ising solver on the cloud optimization system 108, based on the methods described in FIGS. 4, 5, 6, 7, and 8. Also, the system 102 may be able to encode the generated QUBO formulation based on any combination of the privacy protection levels. FIG. 8 is merely presented as an example of combination of two privacy protection levels (as described in FIG. 6 and FIG. 7). The description of any other combination of the plurality of privacy protection levels has been omitted from the sake of brevity.

Various embodiments of the disclosure may provide a non-transitory computer-readable storage medium configured to store instructions that, in response to being executed, causes a system (such as the system 102) to perform operations that include receiving a first input corresponding to a selection of a first combinatorial optimization problem and receiving a set of datapoints as input for the first combinatorial optimization problem. The operations may further include generating a first quadratic unconstrained binary optimization (QUBO) formulation based on the first objective function and the received set of datapoints and selecting a first privacy setting for the generated first QUBO formulation. The operations may further include encoding the first QUBO formulation to generate a second QUBO formulation based on the selected first privacy setting and submitting the generated second QUBO formulation to an optimization solver machine (such as the optimization solver machine 110). The second QUBO formulation may be submitted via an application programming interface (API) call. The operations may further include receiving a first solution of the submitted second QUBO formulation from the optimization solver machine and decoding the first solution to produce a second solution of the first QUBO formulation. The operations may further include publishing an output of the combinatorial optimization problem on a user device (such as the user device 104) based on the second solution.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
receiving a first input corresponding to a selection of a first combinatorial optimization problem;
receiving a set of datapoints as input for the first combinatorial optimization problem which comprises a first objective function and one or more constraint functions;
generating a first quadratic unconstrained binary optimization (QUBO) formulation based on the first objective function and the received set of datapoints;
selecting a first privacy setting for the generated first QUBO formulation;
encoding, based on the selected first privacy setting, the first QUBO formulation to generate a second QUBO formulation;
submitting, via an application programming interface (API) call, the generated second QUBO formulation to an optimization solver machine;
receiving, from the optimization solver machine, a first solution of the submitted second QUBO formulation;
decoding the first solution to produce a second solution of the first QUBO formulation; and
publishing an output of the first combinatorial optimization problem on a user device based on the second solution.

2. The method according to claim 1, further comprising:
displaying a set of user-selectable templates corresponding to a set of combinatorial optimization problems onto an electronic user interface (UI) of the user device; and
receiving the first input comprising a selection of a first user-selectable template associated with the first combinatorial optimization problem,
wherein the selection of the first user-selectable template corresponds to the selection of the first combinatorial optimization problem.

3. The method according to claim 1, wherein the first combinatorial optimization problem is one of a graph coloring problem, a clique problem, an independent set problem, a clique cover problem, a minimax matching problem, a Knapsack problem, a sub-set sum problem, a bin packing problem, a cutting stock problem, a number partition problem, a Hamiltonian cycle problem, a travelling salesman problem, a direct feedback set problem, a vehicle routing problem, a job shop scheduling problem, a generalized assignment problem, a quadratic assignment problem, a set packing problem, a set partition problem, a set covering problem, or a K-Plex problem.

4. The method according to claim 1, further comprising:
determining the first objective function and a first set of constraints associated with the first combinatorial optimization problem;
displaying the determined first objective function and the determined first set of constraints onto an electronic User Interface (UI) of the user device;
receiving a second input corresponding to a modification to one or more of the displayed first objective function and the displayed first set of constraints through the electronic UI; and
generating the first QUBO formulation further based on the received second input.

5. The method according to claim 4, wherein the first input corresponds to one or more of:
addition of a constraint to the determined first set of constraints,
deletion of at least one constraint from the determined first set of constraints,
modification of a first constraint of the determined first set of constraints, or
modification of the determined first objective function.

6. The method according to claim 1, wherein the encoding comprises:
selecting a first penalty term of the generated first QUBO formulation;
randomly sampling a range of penalty values to assign a first penalty value to the selected first penalty term; and
generating the second QUBO formulation based on the assigning the first penalty value.

7. The method according to claim 1, wherein the encoding comprises:
determining a first set of binary decision variables of the generated first QUBO formulation;
updating the first QUBO formulation by:
appending one or more redundant binary decision variables to the determined first set of binary decision variables of the first QUBO formulation; and
randomly assigning a binary value to each of the appended one or more binary decision variables; and
generating the second QUBO formulation by recalculating a Q-matrix of the updated first QUBO formulation.

8. The method according to claim 7, wherein the encoding further comprises:
adding one or more constraints or penalty terms to the updated first QUBO formulation based on the assigned binary value; and
generating the second QUBO formulation by recalculating the Q-matrix of the updated first QUBO formulation after the adding.

9. The method according to claim 7, wherein the decoding the first solution comprises removing the appended one or more binary variables from the first solution to produce the second solution of the first QUBO formulation.

10. The method according to claim 1, wherein the encoding comprises:
determining a first set of binary decision variables of the generated first QUBO formulation;
updating the first QUBO formulation by arranging an initial sequence of the first set of binary decision variables of the generated first QUBO formulation according to a random sequence setting;
generating the second QUBO formulation by recalculating a Q-matrix of the updated first QUBO formulation; and
storing the random sequence setting in memory associated with the user device.

11. The method according to claim 10, wherein the decoding the first solution comprises:
retrieving the random sequence setting from the memory;
rearranging the first set of binary decision variables of the first solution back to the initial sequence based on the retrieved random sequence setting; and
producing the second solution based on the rearranging.

12. The method according to claim 1, wherein the encoding comprises:
determining a first set of binary decision variables of the generated first QUBO formulation;
updating the first QUBO formulation by:
appending one or more redundant binary decision variables to the determined first set of binary decision variables of the first QUBO formulation; and randomly assigning a binary value to each of the appended one or more binary decision variables;

adding one or more constraints or penalty terms to the updated first QUBO formulation based on the assigned binary value;

after the adding, modifying the updated first QUBO formulation by arranging an initial sequence of the first set of binary decision variables and the appended one or more redundant binary decision variables according to a random sequence setting;

generating the second QUBO formulation by recalculating a Q-matrix of the modified first QUBO formulation; and storing the random sequence setting in memory associated with the user device.

13. The method according to claim 12, wherein the decoding the first solution comprises:

retrieving the random sequence setting from the memory;

rearranging the first set of binary decision variables and the appended one or more binary decision variables of the first solution back to the initial sequence based on the retrieved random sequence setting;

after the rearranging, removing the appended one or more binary variables from the first solution; and producing the second solution based on the removing.

14. The method according to claim 1, further comprising precluding a submission of information describing the first combinatorial optimization problem to the optimization solver machine.

15. A non-transitory computer-readable storage medium configured to store instructions that, in response to being executed, cause a system to perform operations, the operations comprising:

receiving a first input corresponding to a selection of a first combinatorial optimization problem;

receiving a set of datapoints as input for the first combinatorial optimization problem which comprises a first objective function and one or more constraint functions;

generating a first quadratic unconstrained binary optimization (QUBO) formulation based on the first objective function and the received set of datapoints;

selecting a first privacy setting for the generated first QUBO formulation;

encoding, based on the selected first privacy setting, the first QUBO formulation to generate a second QUBO formulation;

submitting, via an application programming interface (API) call, the generated second QUBO formulation to an optimization solver machine;

receiving, from the optimization solver machine, a first solution of the submitted second QUBO formulation;

decoding the first solution to produce a second solution of the first QUBO formulation; and publishing an output of the combinatorial optimization problem on a user device based on the second solution.

16. The non-transitory computer-readable storage medium according to claim 15, further comprising:

determining the first objective function and a first set of constraints associated with the first combinatorial optimization problem;

displaying the determined first objective function and the determined first set of constraints onto an electronic User Interface (UI) of the user device;

receiving a second input corresponding to a modification to one or more of the displayed first objective function and the displayed first set of constraints through the electronic UI; and generating the first QUBO formulation further based on the received second input.

17. The non-transitory computer-readable storage medium according to claim 15, wherein the encoding comprises:

selecting a first penalty term of the generated first QUBO formulation;

randomly sampling a range of penalty values to assign a first penalty value to the selected first penalty term; and generating the second QUBO formulation based on the assigning the first penalty value.

18. The non-transitory computer-readable storage medium according to claim 15, wherein the encoding comprises:

determining a first set of binary decision variables of the generated first QUBO formulation;

updating the first QUBO formulation by:

appending one or more redundant binary decision variables to the determined first set of binary decision variables of the first QUBO formulation; and randomly assigning a binary value to each of the appended one or more binary decision variables; and generating the second QUBO formulation by recalculating a Q-matrix of the updated first QUBO formulation.

19. The non-transitory computer-readable storage medium according to claim 15, wherein the encoding comprises:

determining a first set of binary decision variables of the generated first QUBO formulation;

updating the first QUBO formulation by arranging an initial sequence of the first set of binary decision variables of the generated first QUBO formulation according to a random sequence setting;

generating the second QUBO formulation by recalculating a Q-matrix of the updated first QUBO formulation; and storing the random sequence setting in memory associated with the user device.

20. A system, comprising:

a processor configured to:

receive a first input corresponding to a selection of a first combinatorial optimization problem;

receive a set of datapoints as input for the first combinatorial optimization problem which comprises a first objective function and one or more constraint functions;

generate a first quadratic unconstrained binary optimization (QUBO) formulation based on the first objective function and the received set of datapoints;

select a first privacy setting for the generated first QUBO formulation;

encode, based on the selected first privacy setting, the first QUBO formulation to generate a second QUBO formulation;

submit, via an application programming interface (API) call, the generated second QUBO formulation to an optimization solver machine;

receive, from the optimization solver machine, a first solution of the submitted second QUBO formulation;

decode the first solution to produce a second solution of the first QUBO formulation; and publish an output of the combinatorial optimization problem on a user device based on the second solution.

\* \* \* \* \*